United States Patent [19]
Egli

[11] Patent Number: 4,695,160
[45] Date of Patent: Sep. 22, 1987

[54] ERROR CANCELLING BIAS SYSTEM

[75] Inventor: Werner H. Egli, Minneapolis, Minn.

[73] Assignee: Honeywell Inc., Minneapolis, Minn.

[21] Appl. No.: 339,357

[22] Filed: Jan. 15, 1982

Related U.S. Application Data

[63] Continuation-in-part of Ser. No. 280,955, Jul. 6, 1981, abandoned.

[51] Int. Cl.⁴ .............................................. G01C 19/64
[52] U.S. Cl. .................................................... 356/350
[58] Field of Search ........................................ 356/350

[56] References Cited

U.S. PATENT DOCUMENTS

| 3,373,650 | 3/1968 | Killpatrick | 356/350 |
| 4,132,482 | 1/1979 | Friedland | 356/350 |
| 4,243,324 | 1/1981 | Friedland | 356/350 |
| 4,248,534 | 2/1981 | Elbert | 356/350 |
| 4,255,054 | 3/1981 | Friedland | 356/350 |
| 4,445,779 | 5/1984 | Johnson | 356/350 |
| 4,504,146 | 3/1985 | Morgan | 356/350 |

OTHER PUBLICATIONS

"The Laser Gyro", Aronowitz, Laser Applications, vol. I, 1977, Academic Press, Inc., N.Y. & London.
Roland et al, "Periodic Faraday Bias & Lock-In Phenomena in a Laser Gyro", Applied Optics, vol. 12, #7, Jul. 1973, 1460–1467.

Primary Examiner—Vincent P. McGraw
Attorney, Agent, or Firm—Robert A. Pajak

[57] ABSTRACT

A laser angular rate sensor with a lock-in error cancelling biasing system is disclosed.

11 Claims, 16 Drawing Figures

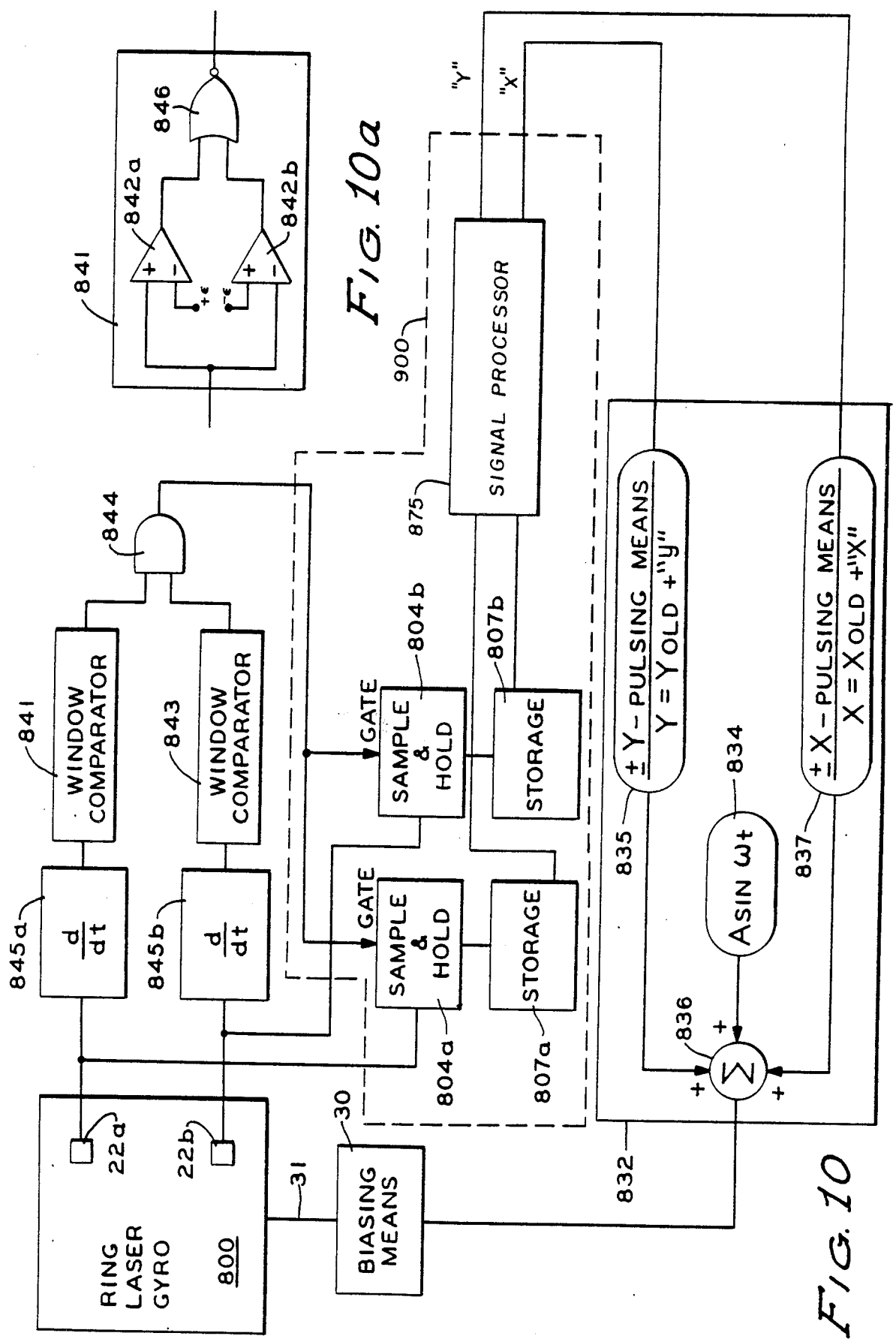

ERROR CANCELLING BIAS SYSTEM

This application is a continuation-in-part of a copending patent application Ser. No. 280,955, now abandoned, filed July 6, 1981, by Werner H. Egli entitled ERROR CANCELLING BIAS SYSTEM, which is assigned to the same assignee as the present invention.

Reference is hereby made to a copending application by Avery Morgan, et al, entitled "Ring Laser Gyro System" having Ser. No. 280,423, U.S. Pat. No. 4,529,311, an application by Avery Morgan, entitled "Ring Laser System" having Ser. No. 280,770, U.S. Pat. No. 4,504,146, and an application by Allan Johnson, entitled "Dither System for a Spring-Mass System" having Ser. No. 280,954, U.S. Pat. No. 4,445,779, which were all filed on even date with the present application and which are all assigned the same assignee as the present application. Reference is also hereby made to U.S. Pat. No. 3,373,650, by J. E. Killpatrick, entitled, "Laser Angular Rate Sensor", and U.S. Pat. No. 3,467,472, by J. E. Killpatrick, entitled, "Random Bias For Laser Angular Rate Sensor", U.S. Pat. No. 3,627,425 by B. Doyle, entitled "Laser Gyroscope Biasing Apparatus", and U.S. Pat. No. 4,152,071, by Theodore J. Podgorski, entitled, "Control Apparatus" which also are all assigned to the same assignee as the present application.

The present invention relates to an improved method of dithering or biasing a laser angular rate sensor whereby gyro output angle error buildup resulting from the lock-in phenomenon is reduced. Apparatuses for implementing the novel method of the present invention are also disclosed.

In a simple laser angular rate sensor, sometimes referred to as a ring laser gyro, two electromagnetic waves in the form of monochromatic beams of light are generated to propagate in opposite directions substantially along a closed-loop path which defines the input axis about which the rotation rate is sensed. Rotation of the ring laser gyro about the input axis causes the effective lasing path length traveled by one beam to increase and the effective lasing path length traveled by the other beam to decrease. The resulting change in path length of the two beams or waves produces a frequency change in each of the beams, one increasing and the other decreasing, since the frequency of oscillation of the laser beams therein is dependent upon the length of the lasing path. The frequency of each of the two waves, and accordingly the frequency difference between the two waves, is a function of the rotation of the closed-loop path, there being a phase relationship established between the two waves being also a function of the rotation of the closed-loop path.

A frequency difference between the two beams results in the phase, $\psi$, between the beams to change at a rate proportional to the frequency difference. The total phase change, $\Delta\psi$, between the two beams is proportional to the time integral of the frequency difference, and is representative of the time integral of the input rotation rate about the gyro input axis. The total phase change over a time interval, therefore, is indicative of the total angular displacement about the gyro input axis during the integrated time interval, and the rate of change of phase, $d\psi/dt$, between the two waves is indicative of the rate of rotation about the gyro input axis.

However, at low rotational rates the difference in frequency between the two beams is small, and the two beams tend to resonate together or "lock-in" so that the two beams oscillate at only one frequency. Thus, in a simple laser gyro, it becomes impossible to measure low rotation rates since the frequency difference is zero at these low rotation rates. At rotation rates below which the frequency difference between the two beams becomes zero is commonly referred to as the "lock-in rate". When the gyro is rotating at rotation rates below the lock-in rate and the beams are locked-in, a gyro output angle error results. Of course, any inability to accurately measure low rotation rates reduces the effectiveness of a laser angular rate sensor in navigational systems. Thus, much developmental work has been conducted in the field of laser angular rate sensors for the purpose of reducing or eliminating the effects of "lock-in" so that the laser angular rate sensor may be more effectively used in navigational systems.

One technique for attempting to reduce or eliminate the effects of "lock-in" is disclosed in U.S. Pat. No. 3,373,650, in the name of Joseph E. Killpatrick also assigned to the present assignee. Disclosed therein, is a laser angular rate sensor wherein a means is provided for introducing a frequency bias in the two oppositely traveling beams of light. The frequency bias provided is such that there exists a frequency difference between the two oppositely traveling beams of light which is greater than the frequency difference which occurs just prior to "lock-in" for a majority of the time. Furthermore, the sign or polarity of the frequency bias introduced is periodically reversed so that after one complete cycle of the periodically reversing bias the time integrated frequency difference between the two beams of light is substantially zero. Note that about the instant of time when the sign or direction of the bias reverses the two light beams will tend to "lock-in" since the frequency difference will range from lock-in rate down to zero. The time intervals in which the beams are locked-in are very short and consequently any possibly resulting gyro output angle error accumulation resulting therefrom is greatly reduced. Nevertheless, the resulting error accumulates in the gyro output angle signal, and in time can amount to a bothersome level, particularly in precision navigational systems.

An improvement of the biasing system disclosed in U.S. Pat. No. 3,373,650 is disclosed in U.S. Pat. No. 3,467,472 also in the name of Joseph E. Killpatrick and also assigned to the present assignee. U.S. Pat. No. 3,467,472 discloses a biasing system which provides the periodically reversing bias taught in U.S. Pat. No 3,363,650, but also additionally provides a randomizing bias so that the small gyro output angle errors which occur about those instances when the bias reverses will be randomized resulting in a reduced average cumulative error. Although the improvement provided by U.S. Pat. No. 3,467,472 was substantial, further improvements in reducing lock-in error would be required for the laser angular rate sensor to have broad applications in inertial navigational systems.

SUMMARY OF THE INVENTION

The present invention provides an improved dithering or biasing system for a laser angular rate sensor so as to substantially reduce the effects of lock-in. The improved biasing system alters the frequency bias introduced, affecting the frequencies of the two countertraveling beams of light and the phase therebetween in a predetermined manner resulting in the error accumulated over at least two successive biasing periods or dither cycles to approach substantially zero. The technique of altering the amplitude of the frequency bias may be implemented with or without applying the principle of random biasing.

BRIEF DESCRIPTION OF THE DRAWINGS

FIG. 10 is a more detailed block diagram of the system shown in FIG. 8.

FIG. 10a is a diagram of one embodiment of the window comparator of FIG. 10.

DESCRIPTION OF THE INVENTION

A laser gyro assembly consists of a lasing gain medium for providing two waves of substantially monochromatic electromagnetic energy, herein referred to as beams of light, and a plurality of reflectors defining a closed-loop path, an enclosed area, and an axis orthogonal to the enclosed area generally defined as the gyro input axis. The two beams of light are directed to travel along the closed-loop path in opposite directions, i.e. counter-traveling beams of light. A readout means is provided for monitoring the frequency difference between the two counter-traveling beams of light. The monitoring means may be accomplished by detecting the instantaneous phase between the two counter-traveling beams of light, and using two detectors to distinguish between positive and negative phase changes in order to distinguish between corresponding clockwise and counterclockwise inertial rotations of the closed-loop path about the gyro input axis. Note that although the rate of change of phase between the two beams is indicative of rotation rate, a zero rate thereof is indicative of either lock-in or zero rotation rate.

Figure 1:
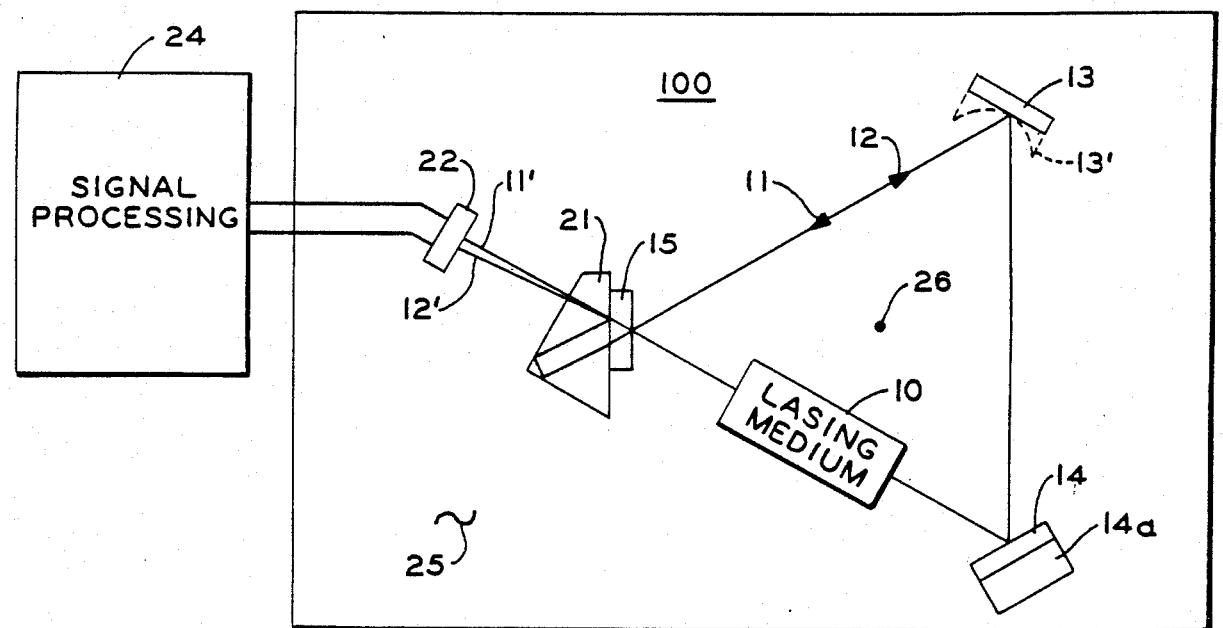
FIG. 1 is a diagrammatic representation of ring laser angular rate sensor of the prior art.

FIG. 1 shows a typical ring laser gyro, 100, which is well known and is shown and described in U.S. Pat. Nos. 3,373,650 and 3,467,472, these patents being incorporated herein by reference. A lasing medium 10 provides two counter-traveling beams, 11 and 12, of substantially monochromatic waves of electromagnetic radiation, herein referred to as beams of light, which travel along a closed-loop triangular path defined by mirrors 13, 14 and 15. The closed-loop path is shown to enclose an orthogonal reference axis, 26, herein referred to as the gyro input axis.

The closed-loop path may be implemented in several ways. For example, mirror 13 may be optionally a concave spherical mirror 13' which provides a means for optical path alignment. Mirror 14, a flat reflecting mirror, may be positionally controlled by transducer 14A. Mirror 14 can be positioned for controlling the path length of the counter-traveling beams of light for optimizing the lasing oscillations. Such a transducer is disclosed in U.S. Pat. No. 3,581,227, by Theodore J. Podgorski also assigned to the present assignee, and a path length control apparatus is disclosed in U.S. Pat. No. 4,152,971, also by Theodore J. Podgorski and also assigned to the present assignee.

A laser gyro readout means is provided by the combination of mirror 15, combiner prism 21, and detector 22. Mirror 15 is shown as a partially transparent flat mirror which allows a portion of energy of each of the counter-traveling beams 11 and 12 to pass therethrough. The portion of energy of the counter-traveling beams 11 and 12 transmitted through mirror 15 passes through a combiner prism 21 so that the output beams of light from the combiner prism 21, shown as beams 11' and 12', are at a slight angle with respect to each other.

The transmitted-energy waves 11' and 12' from combiner prism 21 are uniquely related to the frequency and phase of counter-traveling beams of light 11 and 12. The two energy beams 11' and 12' are superimposed on detector 22 to create an interference fringe pattern of alternate light and dark intensity bands indicating the behavior of the instantaneous phase relationship between the two counter-traveling beams of light. If the frequency of the two counter-traveling light waves are identical, the instantaneous phase between the two counter-traveling beams remains fixed, and the fringe pattern will also remain fixed. However, if the frequencies of the two counter-traveling light beams are different, the instantaneous phase relationship established between the two counter-traveling beams changes with time and the fringe pattern will appear to move to the right or left depending upon which beam is at the higher frequency. Thus, by monitoring the instantaneous phase relationship between the two beams of light, the magnitude and direction of rotational motion about the input axis, 26, can be determined. The direction of the motion is determined by the direction of phase change, i.e. which beam is at a higher frequency, and the angle of rotation, i.e. angular displacement of the closed-loop path from some reference position is measured by the number of fringe changes and portions thereof passing a fixed reference mark in the detector. Each complete fringe change (i.e. max. to min. to max. intensity) represents a phase change of $2\pi$ radians between the two beams of light. The rate of change in fringe motion is indicative of the rate of rotation of the closed-loop path about the laser gyro input axis, 26.

Figure 1A:
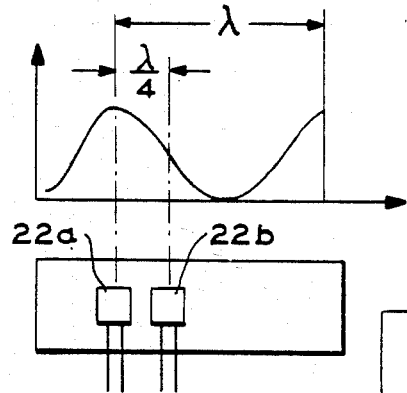
FIG. 1a is a diagrammatic representation of an example of phase angle sensing means used in the sensor of FIG. 1.

One example of a means for sensing the ring laser gyro phase between the two laser beams therein is shown in FIG. 1a, consisting of two detectors 22a and 22b mounted at the output of the combiner prism 21 and spaced so that they are about a quarter of a fringe spacing apart, ($\lambda/4$), the physical dimension depending upon the optical relationships therein. Detectors 22a and 22b can be photodetectors providing output signals indicative of the intensity of the fringe pattern. Separating detectors 22a and 22b about a quarter of a fringe spacing apart, the photodetector outputs are phased so that the direction, as well as magnitude, of fringe motion can be monitored. When the gyro is rotated clockwise, the fringe pattern moves in one direction. When the gyro rotation is reversed, the fringe motion will reverse. The detector output signals are simply processed to determine the rate of rotation by counting the number of intensity maximums and minimums, and portions thereof, resulting from fringe motions passing one of the detectors (i.e. light to dark), and are processed to determine the rotation direction by comparing the directional change of the two intensity signals provided by detectors 22a and 22b. Note that the value of the intensity detected by each detector is indicative of the instantaneous phase between the oppositely directed beams of light each offset by a different measurement offset angle $\beta$ as will be further explained.

At each instant of time, each photodetector will respond to a different intensity as indicated in the drawing shown in FIG. 1a. Each of these detector outputs are directly related to the phase between the beams, $\psi$, offset by some offset phase constant, $\beta$, dependent upon the spatial location of the detector relative to the intensity of the pattern and the instantaneous phase, $\psi$. In the example illustrated in FIG. 1a, the value of $\beta$ is $\pi/2$ radians which corresponds to $\lambda/4$, if perfectly positioned. In the following exposition, the value of $\beta$ is implied by expressions including $\psi$.

Referring again to FIG. 1, the outputs of detectors 22a and 22b are fed into signal processing circuitry 24 which is well known in the art for processing the output signals of detectors 22a and 22b for determining angular rotation, magnitude and direction, and rotation rate. Some possible arrangements of signal processing circuitry 24 are described in the referred to U.S. Pat. No. 3,373,650, and U.S. Pat. No. 3,627,425 by Barrett Doyle, and also assigned to the present assignee. The signal from each detector is amplified and used to trigger digital counters that monitor, relative plus and minus counts. Each count represents a phase change of $2\pi$ radians between the two beams of light oppositely traveling along the closed-loop path about input axis 26. The relationship between each count and the angular displacement of the angular rate sensor about the input axis thereof is dependent upon the sensor's relationship between input rate and beam frequency difference (i.e. scale factor). As an example, it is possible to construct a laser gyro having the relationship of 1°/hour (1/15 of earth's turning rate) inertial input rate of rotation causing a frequency difference of 1 HZ between the two beams of light in the laser gyro cavity. One degree per hour is exactly one arc-second per second of time; therefore each second an inertial angle of one arc-second has been generated, a phase change of $2\pi$ radians between the two beams results. This is so since the time integral of the frequency difference of 1 HZ over a time period of integration of one second is $2\pi$ radians. Each count then has a weight of one arc-second, and turning the sensor through an angle of 360°, or one revolution about the input axis would produce an output of 1,296,000 counts or pulses. For rotations in one direction, these pulses are identified as positive, and in the opposite direction they are identified as negative. (The logic is similar to that used in digital incremental angle encoders.)

Typically, the closed-loop path shown in FIG. 1 is supported by a supporting means 25 for measuring rotation about the gyro input axis 26. Although, detector 22 is shown to be also supported by supporting means 25, it may be external thereto. Although the lasing medium is shown in FIG. 1 to be in the path of the two counter-traveling beams of light, the invention described herein is not limited to such an apparatus. The lasing medium is only required to generate two beams of light oppositely traveling along the closed-loop path supported by supporting means 25 such that the beams resonate in the closed-loop path.

A detailed description of the operation of the laser angular rate sensor shown in FIG. 1 will now be described. When no rotation exists about the input axis 26, the frequency of the light beams 11 and 12 are equal and the fringe pattern created on detector 22 by beams 11' and 12' remain fixed. When support means 25 rotates about axis 26, one of the light beams will increase in frequency while the other light beam will decrease in frequency depending on the direction of rotation. Correspondingly, the fringe pattern on detector 22, created by beams 11' and 12', moves at a rate proportional to the frequency difference between the two beams 11 and 12 and the intensity measured by either of detectors 22a or 22b is indicative of the phase between the two counter-traveling beams 11 and 12. The rate of change of phase is indicative of rotation and can be mathematically described by equation (1).

$$(d\psi/dt) = \dot{\psi} = S\omega_i + S\omega_L \cos \psi \qquad (1)$$

where:
$\psi$ = instantaneous phase between the two beams of light;
S = gyro scale factor
$\omega_i$ = gyro input rotation rate
$\omega_L$ = gyro lock-in rate Equation 1 describes the lock-in error relationship between the input rate and the observable phase relationship. Note that the rate of change in phase is directly related to input rate but altered by an error term including the gyro lock-in rate $\omega_L$. At input rotations below $\omega_L$, the error term is quite significant. This error term is usually called the lock-in error and is particularly bothersome in determining angular rotation.

The phase relationship between the beams is observable by a photodetector whose dimensions are much smaller than the fringe spacing, and a measurement of the rotation rate can be made by simply recording the rate at which the fringe spacing or intensity maximum moves past the detector, the rate being proportional to the frequency difference. Each time that one fringe spacing is recorded represents a phase change of $2\pi$ radians between the two beams. The integral of the frequency difference over a time interval (the count of fringe changes) is proportional to the total phase change between the two beams, as indicated earlier, and thus proportional to the total angular displacement of the closed-loop path about the gyro input axis in the time interval of integration. This is mathematically shown as $$\Delta\psi = \int_{T_1}^{T_2} (f_2 - f_1)\, dt$$

where $\Delta\psi$ is the total phase change during the time interval of integration in radians between beams 11 and 12 having frequency $f_2$ and $f_1$, the sign being indicative of the direction of rotation.

Each time that one fringe spacing is detected can be referred to as "a count". The total number of counts and fraction thereof (the total phase change) multiplied by a scale factor indicates the angular displacement in the time interval of integration, and the rate of change of counts is indicative of the rotation rate.

Equation (1) can be expressed in different units using the output counts of photodetector 22 and is shown in equation (2).

$$(dC/dt) = (dI/dt) + F_L \cos(2\pi C) \quad (2)$$

where:
  I = sensor input angular displacement expressed in counts, and dI/dt is the sensor input rate expressed in counts/sec;
  $F_L$ = gyro lock-in rate expressed in counts per second,
  C = gyro angular displacement output expressed in counts, and dC/dt is the gyro output rate, both include lock-in error.

Because of lock-in, the output C may not be equal to the actual input I. A gyro output angle lock-in error may be defined by a lock-in error variable, E, as shown in equation (3):

$$E = C - I \quad (3)$$

Equation (3) simply states that the gyro output angle count is equal to the input angular displacement due to angular rotation about the gyro input axis plus some error, as shown in equation (4).

$$C = I + E \quad (4)$$

Substituting equation (4) into equation (2) yields an error equation (5) expressed in gyro output counts:

$$(dE/dt) = \dot{E} = F_L \cos[2\pi(I+E)] \quad (5)$$

Equation (5) describes the lock-in error inherent in the ring laser angular rate sensor of the class exemplified in FIG. 1. The sensor output is a signal related to the inertial input angle to be measured by the sensor, and is provided by signal processing circuitry 24. The sensor output contains lock-in error substantially described by equation (5). In the discussion which follows, it is to be assumed that there exists a sensor output signal related to the inertial input to the sensor but which contains lock-in error. The object of the invention being, of course, to minimize the lock-in error contained in the usual sensor output signal. The use of equation (5) will be more apparent in the discussion that follows.

As indicated earlier, disclosed in U.S. Pat. No. 3,373,650 is a laser gyro in which the frequencies of the two counter-traveling beams of light are provided with a periodically reversing bias so that a time varying frequency difference of alternating sign exists therebetween for a majority of the time, the reversing bias being such that the time-integrated frequency difference between the two beams of light is substantially zero after one complete cycle of the periodically reversing bias. (Although the bias shown in U.S. Pat. No. 3,373,650 is periodic, i.e. repetitious, it need not be periodic but should reverse at a sufficient number of times per second.) As disclosed therein, the periodically reversing bias may be achieved mechanically by providing a real rotational motion of the gyro, or by directly effecting a change in the frequency difference between the two beams by, for example, directly affecting the lasing path or lasing medium, —these methods being referred in U.S. Pat. No. 3,373,650 to as "electrically" providing a bias. In the mechanical embodiment, the laser gyro is simply electro-mechanically oscillated or dithered back and forth about the gyro input axis so as to maintain an effective gyro input rotation rate higher than the lock-in rate for a majority of the time, the input rotation rate periodically reversing direction. The oscillating or dithering motion about the gyro input axis provided in the mechanical biasing embodiment effects a frequency change in each beam, one increasing, the other decreasing in one direction of motion, and oppositely acting in the reverse direction of motion. With the frequency of oscillating motion sufficiently fast, and the effective rotation rate caused by the oscillating motion sufficiently large, a varying frequency difference will exist between the beams of light for a majority of time, thus avoiding much of the effects of lock-in even when low rotation rates are to be measured. In the electrical embodiment disclosed therein, an electro-optical device such as a Faraday medium is used in the path of the two counter-traveling beams to introduce a frequency bias in the two laser beams by effecting a change in the lasing path providing a direct separation of lasing beam frequencies. In both the mechanical and electrical embodiments described in U.S. Pat. No. 3,373,650, the frequency of at least one of the two counter-traveling beams is biased or altered so that a frequency difference exists between the two counter-traveling beams of light for a majority of the time. The biasing provided periodically reverses, that is, the frequency difference changes "sign", so that the time integral of the frequency difference between the two counter-traveling beams is substantially zero for one biasing or dither cycle.

Further shown in FIG. 1 is a diagrammatic representation of a periodically reversing biasing means 30 for biasing the frequencies of the two counter-traveling beams. In FIG. 1, biasing means 30 is shown coupled to base 25 through coupling means 31. In a mechanical biasing system, biasing means 30 can be any apparatus which mechanically rotates base 25 about the gyro input axis 26 in a back and forth motion, thus introducing a varying frequency bias, alternating in sign so as to vary the frequency of at least one of the two counter-traveling beams. Note that in a practical sense, biasing means 30 usually produces a periodically reversing frequency bias although periodicity is not necessarily required, that is the frequency bias need not be perfectly repetitious to obtain useful lock-in error reduction.

The rotation or motion caused by biasing means 30 is herein referred to as dither motion. The actual rotation to be determined by the gyro is defined as inertial input motion. Thus, the sensor input motion, I, which the gyro actually measures about gyro input axis 26 is the sum of inertial input motion and dither motion. Therefore, means must be provided for distinguishing between inertial input motion and dither motion to provide an output signal indicative of the inertial input motion only. Techniques for distinguishing between inertial input motion and dither motion are well known in the art and are not shown in FIG. 1. One technique for distinguishing between inertial input motion and dither motion is described in the already referred to U.S. Pat. No. 3,373,650.

As indicated earlier, the bias is provided to maintain the frequency difference between the counter-traveling beams of light to be above that which occurs at lock-in for a majority of the time in the presence of low rotation rates. About times when the mechanical bias reverses direction, i.e. clockwise-counterclockwise, the sign of the frequency difference changes polarity and the corresponding rate of change of phase, $d\psi/dt$ between the beams becomes zero, these times are, herein referred to as "zero rate crossings" and are of importance in describing lock-in error growth as will become more clear below. In an electrical or electro-optical biasing system, a "zero rate crossing" also occurs when the sign of the frequency difference reverses polarity.

The transcendental expression for the gyro output angle rate shown in equation (1) and corresponding equation (2) is a function of the instantaneous phase angle between the two counter-traveling beams, a function of the sensor lock-in rate, and the phase angle measurement offset. In order to attempt a solution to equation (1) yielding an actual quantity of lock-in error, a time varying expression for the value of $\psi$ or C is first obtained which can be provided by a varying bias.

Consider a biasing system similar to those disclosed in U.S. Pat. Nos. 3,373,650 and 3,467,472. In a mechanical biasing system, base 25 of ring laser gyro 100 is mechanically rotated in a back and forth motion in a periodic manner resulting in the frequency difference between the two counter-traveling beams to vary in a sinusoidal manner, periodically alternating in sign. In these circumstances, the instantaneous phase between the two counter-traveling beams continually increases in magnitude with time as base 25 is rotated in one direction. At the instant that the direction of rotation changes from one direction to the opposite direction, the zero rate crossing, the time varying frequency difference tends toward zero. Each zero rate crossing has associated therewith a second derivative, $d^2\psi/dt^2$ and more importantly, a polarity of second derivative which corresponds to a rotation angle direction.

Figure 11:
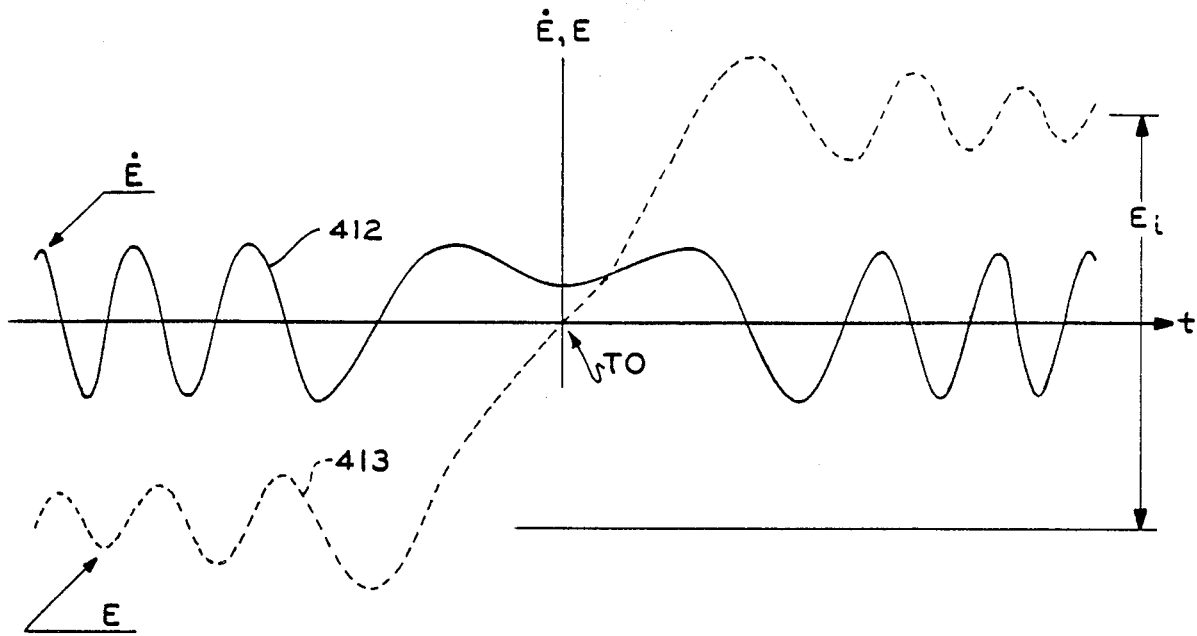
FIG. 11 is a graphical representation of lock-in error inherent in sensor of class shown in FIG. 1.

FIG. 11 graphically illustrates the error resulting from the relation described in equation (5) for a dithered gyro in the zero rate crossing region of rotation direction reversal. Curve 412 plots the error in the gyro rate output against time, showing a decreasing frequency before the zero rate crossing occurring at time T0, and an increasing frequency thereafter. The essentially constant amplitude of curve 412 is dependent on the sensor's characteristic lock-in rate, $\omega_L$ or $F_L$ in units of counts. Curve 413 plots the error in the gyro angular output error, E, (in units of counts) which is obtained by integrating curve 412. As shown, the gyro angular error, E, is oscillating with varying frequency and amplitude before and after the change of direction, and exhibits a step through an incremental error angle Ei across the change of direction. As may be seen from FIG. 11, the error resulting from equation (5) is always present, but has its most important effect about the zero rate crossing. For a periodic sinusoidal dithered ring laser gyro, such a change of direction occurs twice each dither cycle, and such an error as described on curve 413 occurs at each zero rate crossing. Unfortunately, these lock-in errors are not necessarily equal in magnitude nor always opposite in sign in an ordinary biasing system of the prior art, leading to a build up of error in the gyro output sometimes referred to as random drift or random walk.

The discussion presented just above and FIG. 11 was described for a mechanically dithered gyro. Nevertheless, the characteristics of a sensor optically or electrically dithered are similar to those already presented, and therefore will not be discussed in the following discussion.

In the biasing system of the present invention, the frequency bias is controlled so as to vary the instantaneous phase between the two counter-traveling beams of light at successive zero rate crossings in a preselected manner so that the cumulative error over a group of successive dither cycles is substantially zero. The novel biasing system of the present invention is presented in the discussion which follows.

Figure 2:
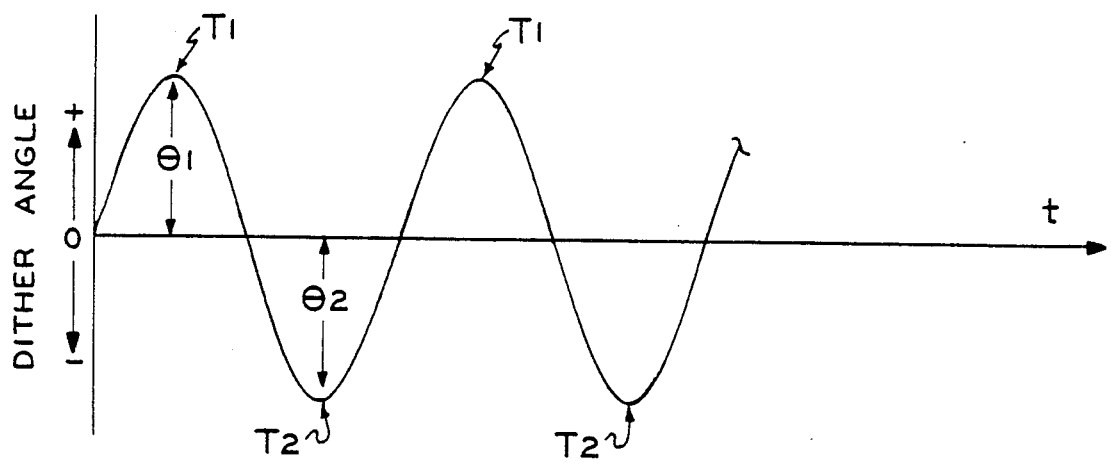
FIG. 2 is a graphical representation of a dither angle versus time for a dithered sensor.

Consider the situation where the inertial input rotation rate is zero, and the sensor rotation rate is only produced by dither motion about the gyro input axis 26 of the laser gyro, and the laser gyro is dithered sinusoidally back and forth about the gyro input axis 26. FIG. 2 shows graphically a sketch of such a situation. Plotted in FIG. 2 is the actual input dither angle, i.e. true gyro input angle about the gyro input axis 26, I, in counts, vs. time for several dither cycles where the dither motion is a perfect sinusoid, i.e., equal negative and positive half cycles. Note that "counts" corresponds directly to a phase change, $\Delta\psi$, of $2\pi$ radians. If there were no gyro lock-in rate, the gyro output angle, C, after one complete dither cycle would be zero, and therefore, no error or error build up. Another way of expressing this is that the time integral of the frequency difference between the two counter-traveling beams of light integrated over the time interval of the dither cycle is zero. However, because of lock-in, the cumulative gyro output angle error, E, results as discussed with respect to FIG. 11.

Although the dither shown in FIG. 2 is sinusoidal, its role in the build up of the gyro output angle error, E, may be adequately represented by considering the dither to be parabolic. Namely, a convex parabola having maximum positive dither angle amplitude $\theta_1$ for the positive dither half-cycle, and a concave parabola having maximum negative dither angle amplitude $\theta_2$ for the negative dither half-cycle. Thus, the positive dither angle parabola (i.e. the gyro inertial input angle) may be represented by:

$$I^+ = \theta_1 - \ddot{\theta}_1(t^2/2) \tag{6}$$

and the negative dither angle parabola may be represented by:

$$I^- = \ddot{\theta}_2(t^2/2) - \theta_2 \tag{7}$$

Note that in the discussion which follows, dither angle amplitudes are in units of "counts" and thus have corresponding units of phase changes between the two counter-traveling beams. A positive dither angle corresponds to a first polarity of $d\psi^2/dt^2$ or $d^2C/dt^2$, and a negative dither angle corresponds to a second and opposite polarity of $d^2\psi/dt^2$ as the positive dither angle.

Considering first the positive dither angle parabola, inserting equation (6) into the error equation (5) yields:

$$\dot{E}^+ = F_L \cos\left[ 2\pi \left( E + \theta_1 - \ddot{\theta}_1 \frac{t^2}{2} \right) \right] \quad (8)$$

Unless the laser gyro is of intolerably poor quality, the change in E over several dither half-cycles is very small. Thus, E on the right side of equation (8) can be treated as a constant. Doing so, and integrating over time from minus to plus infinity, we obtain an expression for the incremental gyro output angle error for the positive dither angle parabola as shown in equation (9):

$$\Delta E^+ = \frac{F_L}{\sqrt{\ddot{\theta}_1}} \sin[2\pi (\theta_1 + E + \tfrac{1}{8})] \quad (9)$$

The above integration was based on the Fresnel integral property:

$$\int_{-\infty}^{+\infty} \sin X^2 \, dX = \int_{-\infty}^{+\infty} \cos X^2 \, dX = \sqrt{\frac{\pi}{2}} \quad (10)$$

Similarly, an expression for the incremental error for the negative dither angle parabola may be found in a similar manner and is shown in equation (11):

$$\Delta E^- = \frac{F_L}{\sqrt{\ddot{\theta}_2}} \sin[2\pi (\theta_2 - E + \tfrac{1}{8})] \quad (11)$$

For practical purposes, $\theta_1$, and $\theta_2$, will be nearly equal and will be expressed simply as $\theta$. However, small differences between $\theta_1$ and $\theta_2$ will cause large variations in the trigonometric terms, and thus the distinction between them must be retained.

The total error increment over one complete dither cycle can be expressed as the sum of the error accumulated in the positive dither angle parabola and the error accumulated in the negative dither angle parabola. The sum is:

$$\Delta E = \Delta E^+ + \Delta E^- = \frac{2F_L}{\sqrt{\ddot{\theta}}} \left( \begin{array}{l} \sin[2\pi(A_1 + E)] + \\ \sin[2\pi(A_2 - E)] \end{array} \right) \quad (12)$$

where $$A_1 = \theta_1 + (\tfrac{1}{8})$$

$$A_2 = \theta_2 + (\tfrac{1}{8})$$

Using simple trigonometric identities yields:

$$\Delta E = \frac{2F_L}{\sqrt{\ddot{\theta}}} \left\{ \sin\left[2\pi \left(\frac{A_1 + A_2}{2}\right)\right] \right\} \quad (13)$$

$$\left\{ \cos\left[2\pi \left(E + \frac{A_1 - A_2}{2}\right)\right] \right\}$$

The expression shown in equation (13) is the total incremental gyro output angle error, $\Delta E$, expressed in counts accumulated in one complete dither cycle assuming that the only inertial rotation about the gyro input axis 26 was dither motion.

The error expressed by equation (13) results in the gyro output angle indicating that the gyro has rotated some angle when, in fact, during one complete dither cycle the angular displacement about the gyro input axis 26 is zero. In a navigational system, this would be indicated by some angular turn, which, of course, is false, since the assumption was made in establishing equation (13) that there was no sensor motion other than the dither motion. Each zero rate crossing in each dither cycle constitutes a source of lock-in error. Thus, the gyro output angle error resulting from each half of the dither cycle is cumulative. The resultant cumulative error indicated by equation (13) is the incremental contribution of lock-in error already referred to as random drift or random walk. Excessive cumulative error over continued operation of the laser gyro is unacceptable in precision navigational systems, and thus it is necessary to keep the cumulative error to a minimum or eliminate the error altogether.

In the invention of the present application, the cumulative gyro output error angle for each dither cycle expressed by either of equations (12) or (13) can be substantially reduced by altering the instantaneous phase difference between the two counter-traveling beams of light at successive zero rate crossings by a predetermined value. In a mechanically biased system as described, the instantaneous phase difference can be manipulated by altering the maximum positive and negative dither angle amplitudes at successive zero rate crossings by a preselected amount as will now be described.

Figure 3:
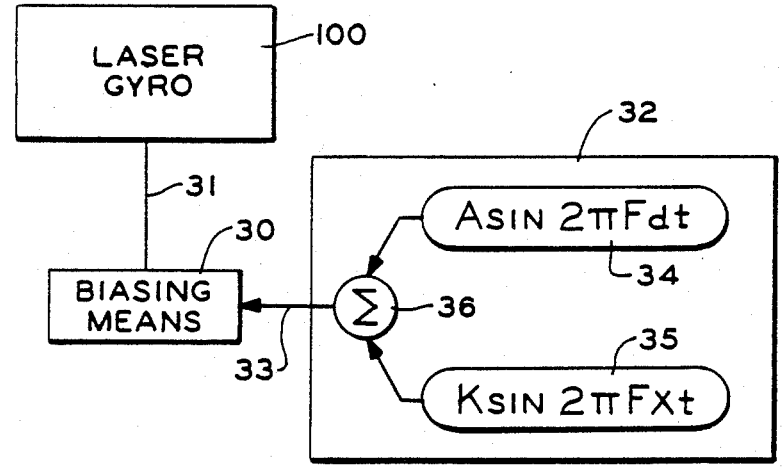
FIG. 3 is a block diagram of one embodiment of the invention.

Shown in FIG. 3 is one error cancelling biasing system of the present application employing the principles of the invention. The ring laser gyro 100 is coupled to biasing means 30 by coupling means 31 similar to that shown in FIG. 1. As before, the biasing system may be mechanically or electrically implemented. For exposition purposes, biasing means 30 and coupling means 31 will be assumed to be the mechanical type, capable of oscillating the ring laser gyro about the gyro input axis 26, effecting a periodically reversing frequency bias of the two counter-traveling beams of light in the ring laser gyro 100. This may be accomplished, for example, by use of a motor coupled to base 25. Biasing means 30 is directed by bias signal generator means 32 providing a bias control signal on coupling means 33 for directing operation of biasing means 30.

The bias control signal presented on connecting means 33 from bias signal generating means 32 is the sum of a first signal component provided by first signal means 34 having an output signal of the form:

A sin $(2\pi F_d t)$ where Fd is the desired dither frequency, and a second signal component provided by second signal means 35 having an output signal of the form:

K sin $(2\pi F_x t)$

Summing means 36 adds the first and second signal components from the first and second signal means 34 and 35 respectively. The output of summing means 36 provides a bias signal generating means 32 output signal herein referred to as the bias control signal. With FX=Fd/2, some fraction of FD, the bias control signal will essentially be a sinusoidal signal in which the maximum positive and negative amplitudes are periodically altered. The periodic variations in the bias control signal amplitudes are substantially determined by the second signal means 35 having a selected amplitude, K, and a selected frequency Fx. The frequency of the sinusoidal variations is determined by Fd.

Figure 4:
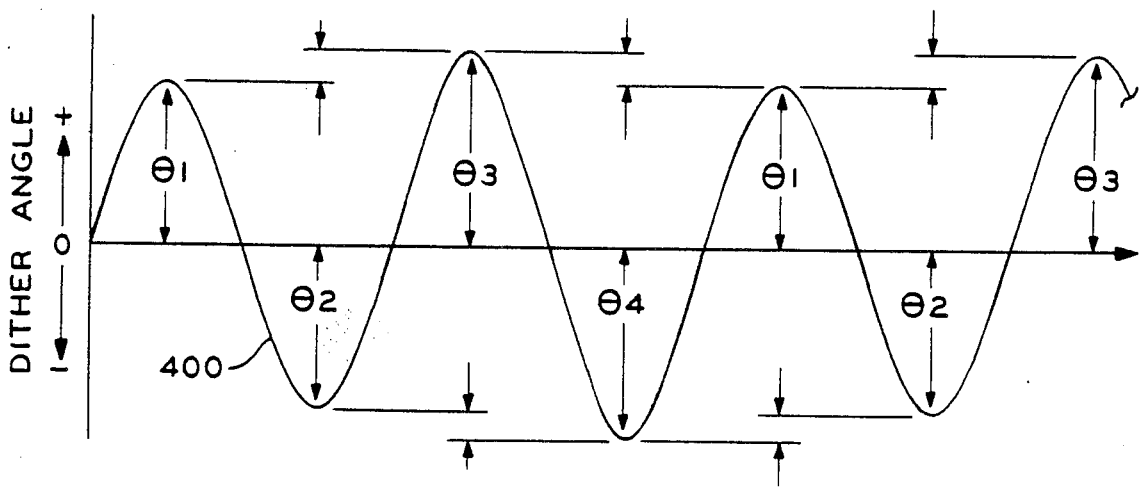
FIG. 4 is a graphical representation of the principles of the invention.

FIG. 4 graphically illustrates error cancelling bias dither motion of the present invention which substantially reduces lock-in error in the usual sensor output. Shown in FIG. 4 is a graphical sketch of the resultant dither motion provided by the embodiment of the invention shown in FIG. 3 where the bias signal generating means provides the bias control signal for directing operation of biasing means 30 for controlling dither motion about the gyro input axis 26. The resultant maximum dither angle amplitude provided by biasing means 30 is periodically altered by a preselected value determined by the bias control signal provided by bias control signal generating means 32. In the situation where Fx=Fd/2, the first sinusoidal dither cycle is shown in FIG. 4 having maximum positive and negative dither angle amplitudes $\theta_1$ and $\theta_2$ respectively. The second sinusoidal dither cycle is shown having maximum positive and negative dither angle amplitudes $\theta_3$ and $\theta_4$ respectively. The third dither cycle is the same as first, and so on. The total incremental gyro output angle error resulting from two successive dither cycles is the sum of each incremental error in each half of each dither cycle, and may be found by application of equations (9) and (11) for the two successive dither cycles shown in FIG. 4, and is expressed in equation (14).

$$\Delta E(\text{2-cycles}) = \Delta E(\theta_1) + \Delta E(\theta_2) + \Delta E(\theta_3) + \Delta E(\theta_4) \quad (14)$$

The total incremental gyro output angle error described by equation (14) for two successive dither cycles can be forced to substantially zero by forcing the following relationships to be held true:

$$\sin[2\pi(\theta_1 + E + \tfrac{1}{4})] = -\sin[2\pi(\theta_3 + E + \tfrac{1}{4})] \quad (15)$$

$$\sin[2\pi(\theta_2 - E + \tfrac{1}{4})] = -\sin[2\pi(\theta_4 - E + \tfrac{1}{4})] \quad (16)$$

As before, E is assumed to be small and relatively constant over a few successive dither cycles.

The expressions shown in equations (15) and (16) are held true whenever:

$$\theta_1 - \theta_3 = N \pm \tfrac{1}{2} \text{ counts} \quad (17)$$

$$\theta_2 - \theta_4 = N \pm \tfrac{1}{2} \text{ counts} \quad (18)$$

where N is any integer.

The expressions shown in equations (17) and (18) indicate that if the maximum positive dither angles, $\theta_1$ and $\theta_3$, differ by a fractional difference of $\pm\tfrac{1}{2}$ of a count, and the maximum negative dither angles, $\theta_2$ and $\theta_4$, differ by $\pm\tfrac{1}{2}$ a count, the resultant incremental gyro output angle error for two successive dither cycles having this relationship will be substantially zero. That is to say that the lock-in error associated with the sensor output as aforesaid is substantially reduced to zero. It is important to emphasize that only the fractional difference in counts between the maximum dither angle amplitudes is important. That is so since an integral number of counts corresponds to an integral number of $2\pi$ phase changes between the two beams and has no effect on lock-in error reduction as indicated by the trigonometric relations already presented in equations (14), (15), and (16).

Referring again to the embodiment shown in FIG. 3, the first signal means 34 is capable of directing biasing means 30 so that ring laser gyro 100 has a maximum positive and negative dither angle amplitude A when operated independently of the second signal means 35. The amplitude of second signal means 35 is selected so that second signal means 35 is capable of directing biasing means 30 so that the laser gyro 100 has a maximum dither angle amplitude of $\tfrac{1}{4}\sqrt{2}$, when operated independently of the first signal means. The sum of the first and second signal means, 34 and 35 respectively, having signals as indicated, will produce a bias signal generating means bias control signal for directing biasing means 32 in which laser gyro 100 oscillates back and forth whereby the dither angle has an amplitude, A, which is alternately enhanced and diminished by $\tfrac{1}{4}$ of a count ($\pi/2$) resulting in the desired fractional difference of $\tfrac{1}{2}$ of a count ($\pi$) between successive maximum positive dither angle amplitudes ad successive maximum negative dither angle amplitudes resulting in the equalities set forth in equations (15) and (16) being satisfied, and the accumulated gyro output angle error over two successive dither cycles to be substantially zero.

An example of biasing means 30 and coupling means 31 is an electromagnet attached to a spring as disclosed in U.S. Pat. No. 3,373,650. Pulses applied to the electromagnet torque the spring resulting in laser gyro 100 dithering in proportion to the magnitude and polarity of the pulse applied. One pulse will effectively cause several cycles of dithering because the system essentially exhibits a high-Q spring-mass characteristic. Each pulse will produce a very lightly damped sinusoidal ringing. If the pulse is combined with a sinusoidally dithering signal, a pulse will produce a very lightly damped sinusoidally ringing dither angle amplitude at the main dither frequency. Such a system is shown in FIG. 5.

Figure 5A:
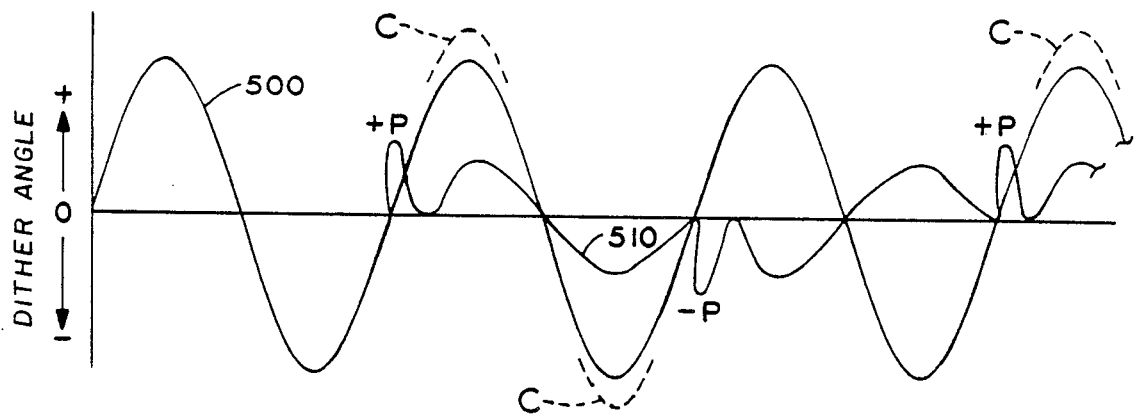
FIG. 5a is a graphical representation of another embodiment of the invention.
Figure 5:
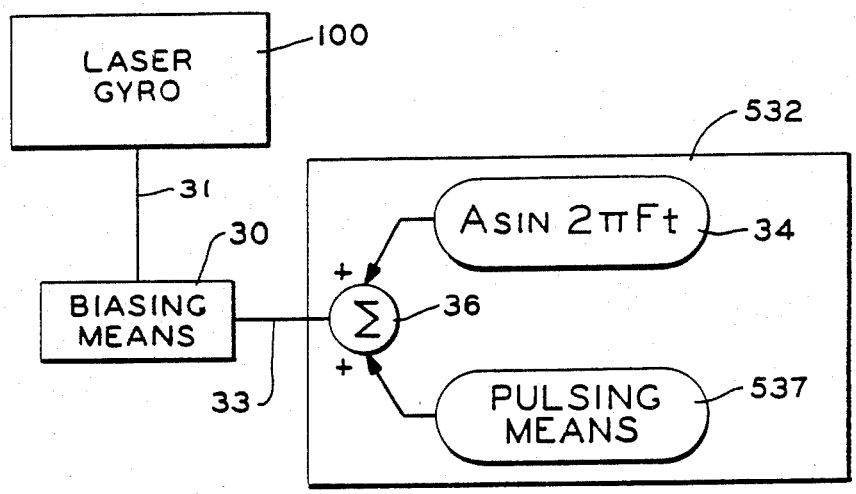
FIG. 5 is a block diagram of another embodiment of the invention.

Shown in FIG. 5 is another embodiment of the invention illustrating another error cancelling biasing system employing the principles of the invention. FIG. 5 is similar to the circuit of FIG. 3 except that bias signal generating means 532 replaces bias signal generating means 32 shown in FIG. 3. Bias signal generating means 532 is similar to bias signal generating means 32 except that second signal means 35 is replaced by pulsing means 537. Pulsing means 537 is capable of providing alternately positive and negative pulses of magnitude P and in phase relationship to the main dither signal provided by first signal means 34 as indicated in FIG. 5a where curve 500 represents the resultant dither motion due to first signal means 34, and curve 510 represents the resultant dither motion due to pulsing means 537. The resultant dither motion from the combination of first signal means 34 and pulsing means 537 being indicated by the periodically enhanced amplitudes C. Appropriate sizing of pulses provided by second signal means 537 will provide essentially the same dithering motion as that provided by the biasing system of FIG. 3. That is to say biasing means 30 will provide an oscillation of laser gyro 100 as shown in FIG. 4 in which the dither angle has an amplitude which is alternately enhanced and diminished by one quarter of a count. In these circumstances, the desired difference of one half of a count between successive maximum positive dither angle amplitudes and successive maximum negative dither angle amplitudes is accomplished resulting in the accumulated gyro output angle error over two successive dither cycles to be substantially zero.

The above analysis with regard to equations (9) through (18) can be more generalized to describe the conditions in which the accumulated gyro output angle error would be substantially zero for a group of M dither cycles. The mathematical expressions in equations (15) and (16) are shown in the general form by the expression shown in equation (19) for a group of M dither cycles where $\theta_p$'s are the individual successive maximum positive dither angle amplitudes, in counts, in the group of M dither cycles, and the $\theta_n$'s are the individual successive maximum negative dither angle amplitudes, in counts, in the same group of M dither cycles, and E is assumed to be small and relatively constant over M dither cycles.

$$\sum_{p=1}^{m} \sin[2\pi(\theta_p + E + \tfrac{1}{8})] = \sum_{n=1}^{m} \sin[2\pi(\theta_n - E + \tfrac{1}{8})] = 0 \quad (19)$$

$$\sum_{p=1}^{m} \cos[2\pi(\theta_p + E + \tfrac{1}{8})] = \sum_{n=1}^{m} \cos[2\pi(\theta_n - E + \tfrac{1}{8})] = 0$$

Equation (19) indicates that predetermined values of the maximum positive and negative dither angle amplitudes of a group of dither cycles satisfying equation (19) can result in the sum of the incremental errors for each successive group of dither cycles being substantially zero. For example, monotonically and fractionally increasing the maximum positive and negative dither angle amplitudes by $\tfrac{1}{4}$ of a count for each successive dither cycle results in zero accumulated error over 8 dither cycles. As before, only the fractional difference of $\tfrac{1}{4}$ of a count between successive maximum dither angle amplitudes, in this example, is what is important because again of the trigonometric relationships. Of course, to achieve the above result, the 8 positive and 8 negative dither maximum angle amplitudes at zero rate crossing need only satisfy the relationship shown in equation (19) and thus need not be monotonically increasing. The 8 dither angle amplitudes, both positive and negative, which satisfy equation (19) can be found from the relationship:

$$A_i = A + \frac{(i-1)}{m} \text{ counts} + n \text{ counts}$$

where:
n = any integer
A = some constant amplitude in counts
M = number of dither cycles in a selected group
i = $i^{th}$ dither cycle of group M.

Thus, many possibilities of altering the maximum dither angle amplitude for a group of successive dither cycles can be utilized to obtain the accumulated error for each successive group of dither cycles to be substantially zero.

As aforesaid, $\theta_p$ and $\theta_n$ in equation (19) are directly related to the instantaneous phase difference between the two counter-traveling beams of light at successive positive and successive zero rate crossing times as described above. Thus, the above discussion also applies to the electrical biasing system referred to above wherein the frequency bias is provided without mechanical rotation.

Note also that the amplitudes used in the above equations are the maximum amplitude of the dither cycles. More importantly, however, is the dither angle amplitude when $d\psi/dt$ is substantially zero corresponding to near zero sensor input rate about the gyro input axis 26, a time when the frequency difference is zero and changing sign direction. The sensor input rate, $d\psi/dt$, being the sum of dither motion plus inertial input motion.

Figure 6:
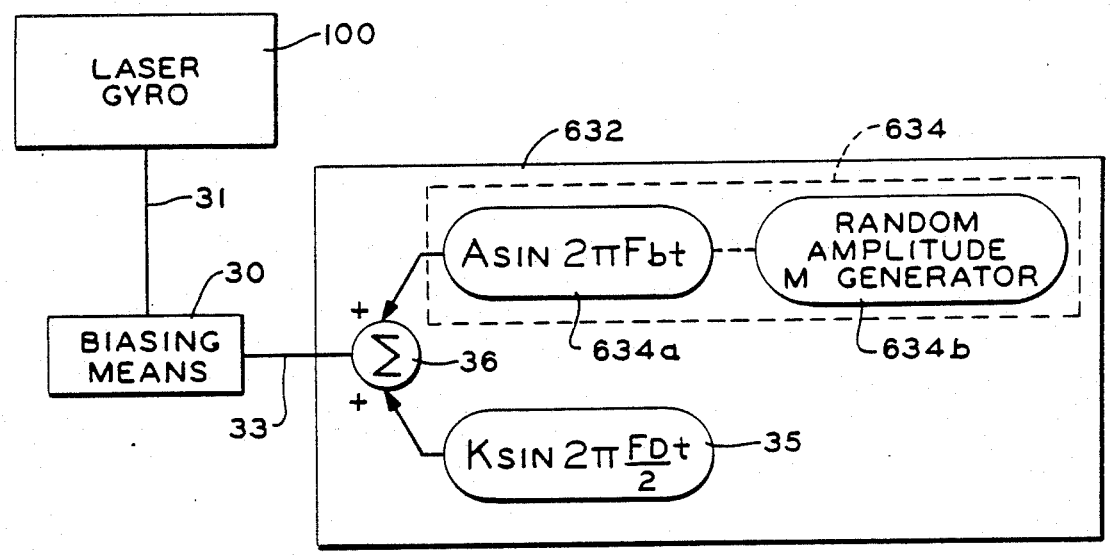
FIG. 6 is a block diagram of another embodiment of the invention.

The biasing systems shown in FIGS. 3 and 5, and the corresponding analysis therewith assume perfect control of the maximum positive and negative dither angle amplitudes so that equations (15) and (16) as well as equation (19) will be satisfied. However, very small perturbations in successive pairs of dither cycles will constitute additional errors not included in the mathematical analysis presented above. The perturbations may not be random and are consequences of the biasing systems selected. In order to randomize these perturbations, a random signal generator may be utilized similar to that shown in the already referred to U.S. Pat. No. 3,467,472. Shown in FIG. 6 is another embodiment of the invention showing an error cancelling biasing system employing the principles of the invention of the present application and the principles of the invention disclosed in U.S. Pat. No. 3,464,472.

Referring now to FIG. 6, there is shown a biasing system similar to FIG. 3 except bias control signal generating means 632 replaces bias signal generating means 32 shown in FIG. 3. Bias control signal generating means 632 is similar to bias control signal generating means 32 except that first signal means 34 in FIG. 3 is replaced by first signal means 634 comprising random amplitude generator 634b coupled to sine function generator 634a. First signal means 634 provides a sine function similar to first signal means 34 except the amplitude thereof for successive pairs of dither cycles randomly changes. First signal means 634 can be similarly used in place of first signal means 34 in the biasing system shown in FIG. 5.

In operation, the biasing system shown in FIG. 6, would consist of dithering the gyro for two dither cycles with some arbitrary and random maximum positive and negative dither angle amplitude which is essentially constant except for being effected by the second signal means which alters the maximum dither angle amplitudes so that the two successive maximum positive dither angle amplitudes and the two successive negative dither angle amplitudes differ by one-half count. Then, the amplitude of the first signal means 634a is randomly changed and held constant for the next two dither cycles and so on. In this manner, any errors resulting from perturbations in the biasing system are randomized so that their average value is substantially reduced.

In the above discussion, the laser gyro was assumed to have only dither motion and the inertial input motion was zero. Now consider the situation where the sensor input motion about the input axis of the laser gyro includes inertial input motion having a constant rotation rate, $I_b$, and the laser gyro is subjected to a dither motion where the amplitude between two successive dither cycles differs by one-half a count as described above. A graphical sketch of this situation is shown in FIG. 7 where the base motion is a constant rotation rate $I_b$ according to equation (20).

$$I_b = i \times 4F_d \quad (20)$$

where $F_d$ is the frequency of the periodic reversing dither, and "i" is the angle increment of inertial input rotation in one quarter of a dither cycle.

Figure 7:
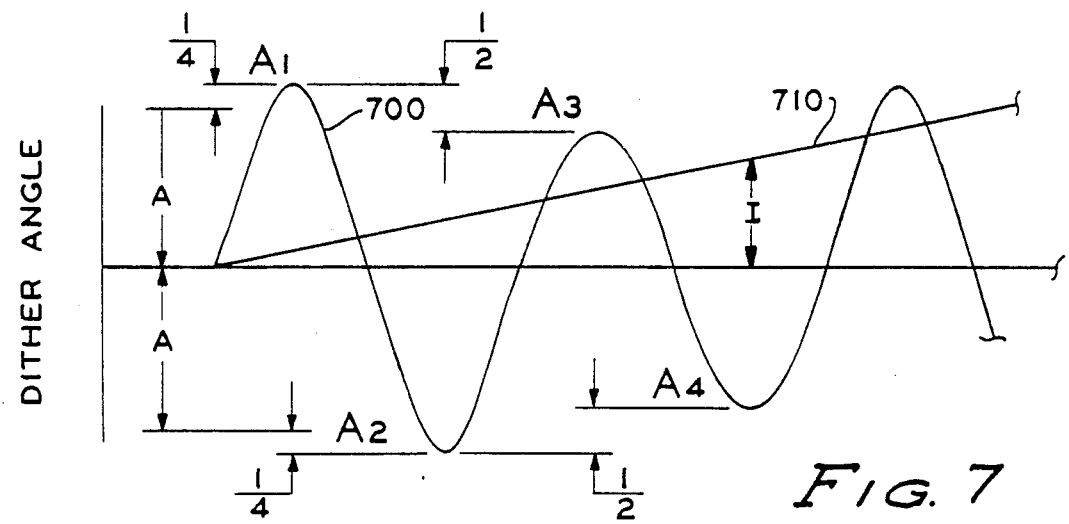
FIG. 7 is a graphical representation of dither angle versus time plus inertial input motion.

In FIG. 7, the two successive maximum positive input angle amplitudes can be mathematically described by:

$$A1 = A + \frac{1}{4} + I - 3i \quad (21)$$

$$A3 = A - \frac{1}{4} + I + i$$

where I is the input rotation angle due to Ib at midway between dither cycles, and A is the nominal input dither angle amplitude enhanced and diminished by ¼ of a count.

The successive maximum negative phase angle amplitudes can be mathematically described by:

$$A2 = A + \frac{1}{4} - I + i \quad (22)$$

$$A4 = A - \frac{1}{4} - I - 3i$$

Substituting these amplitudes shown in equations (21) and (22) into equation (13) and summing the error over two successive dither cycles yields the following expression for the accumulated error in counts resulting from two successive dither cycles:

$$\Delta E = \frac{F_L}{\sqrt{\theta}} \begin{pmatrix} \sin[2\pi(A + \frac{1}{4} + I + E - 3i)] + \\ \sin[2\pi(A + \frac{1}{4} - I - E + i)] + \\ \sin[2\pi(A - \frac{1}{4} + I + E + i)] + \\ \sin[2\pi(A - \frac{1}{4} - I - E - 3i)] \end{pmatrix} \quad (23)$$

Applying trigonometric identities, this becomes:

$$\Delta E = \frac{4F_L}{\sqrt{\theta}} \{\sin[4\pi i]\} \{\cos[2\pi(A - i)] \sin[2\pi(I + E)]\} \quad (24)$$

Equation (24) indicates that the accumulated error over two successive dither cycles in the presence of base motion becomes a function of the inertial input motion. For low base motion rates the biasing systems presented in FIGS. 3, 5 and 6 provide substantial improvement over the prior art. On the other hand, in the presence of relatively fast base motion rates, the error cancelling biasing systems of the present invention already described result in the total lock-in error, the summation of all $\Delta E$'s, growing with inertial input rate which is undesirable at fast inertial input rates. This is so since the effect of inertial input rates on the open loop control of the bias provided in the systems already presented is not taken into account.

Figure 8:
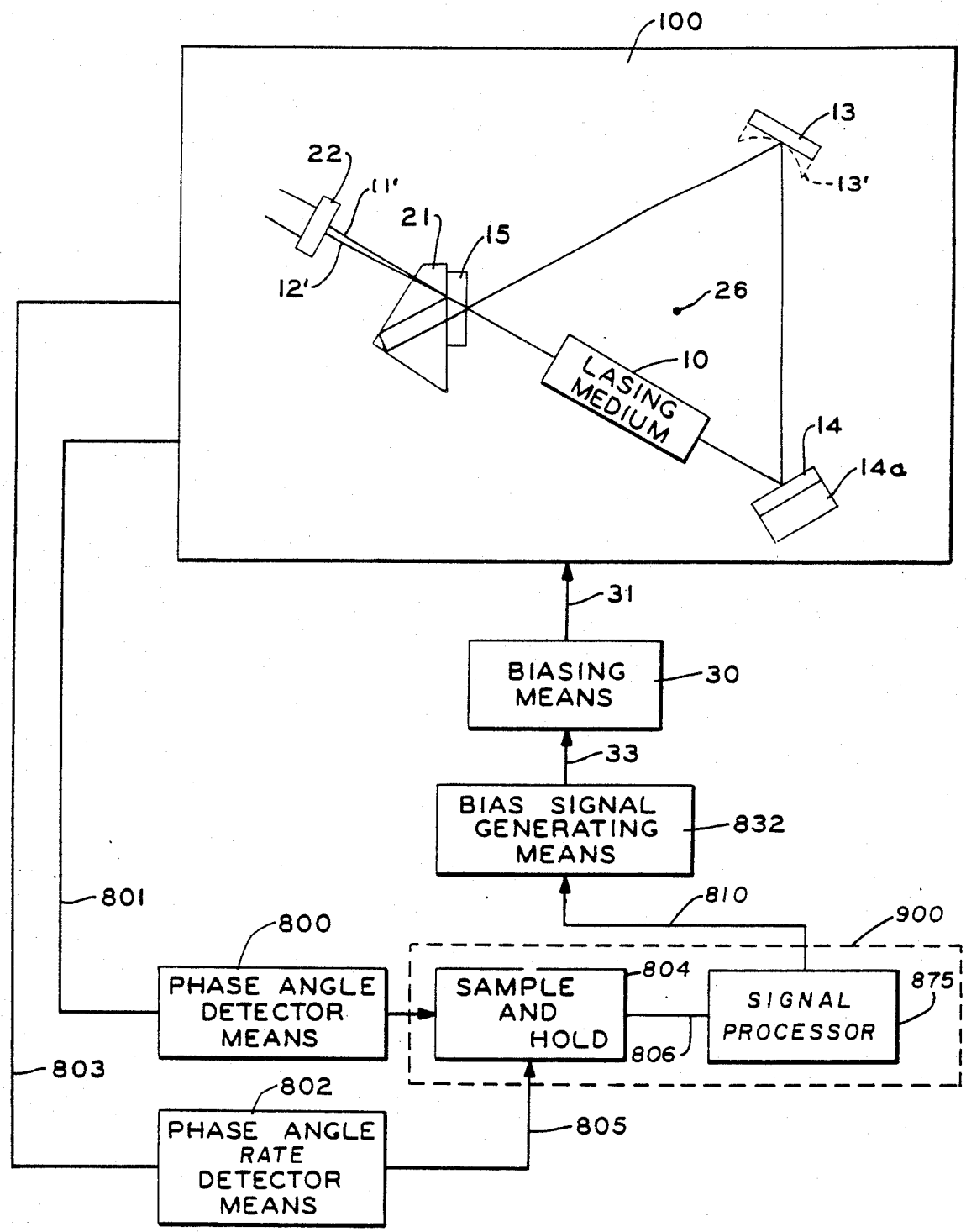
FIG. 8 is a block diagram of closed-loop feedback biasing arrangement employing the principles of the invention.

Shown in FIG. 8 is another embodiment of the invention showing an error cancelling biasing system employing the principles of the invention. In FIG. 8, an error cancelling biasing system for a laser angular rate sensor is presented which utilizes a closed-loop control. The system shown in FIG. 8 achieves desired biasing taking into account the effects of inertial input rates. In FIG. 8, laser gyro, 100, is shown to be coupled to biasing means 30 through coupling means 31 as similarly shown in FIG. 1, and biasing means 30 is directed by the bias control signal provided by bias signal generating means 832 in a similar manner as that shown in FIG. 3. Further shown in FIG. 8 is a phase angle detector means 800 coupled to gyro 100 through coupling means 801. Also coupled to gyro 100 is phase angle rate detector means 802 coupled to gyro 100 through coupling means 803. Phase angle rate detector means 802 is capable of providing an output signal whenever the phase angle between the beams of light of gyro 100 passes through zero ($d\psi/dt=0$). The output signal provided by phase angle rate detector means 802 is thus indicative of the "zero rate crossing", phase angle, the "zero rate crossing" being the same as described earlier.

The phase angle detector 800 output signals are processed by an error signal means 900 including sample and hold circuit 804 which samples and holds the output value of phase angle detector 800 at the zero rate crossing indicated by the output signal of phase angle rate detector means 802 which provides a gating signal for the sample and hold circuit 804 on coupling means 805 connected thereto. Error signal means 900 includes signal processor 875 responsive to the output of the sample and hold circuit 804 provided on signal connecting means 806. The output of error signal means 900 is presented on connecting means 810 to bias control signal generating means 832 for generating a bias control signal in response to signals presented thereto.

In the discussion of equations (12) and (13) and equation (24) which set forth the principles of the invention, the accumulated gyro output angle error was shown to be substantially reduced if the instantaneous phase angle between the two beams of light at the zero rate crossing differ by the chosen value of plus or minus $\pi$ radians. The closed-loop biasing system shown in FIG. 8 applies the principles of the invention described by equations (17), (18), and (19) in which the instantaneous phase angle between the two counter-traveling beams of light at successive zero rate crossings having the same polarity of the second derivative, $d^2\psi/dt^2$, differ by the chosen value of plus or minus $\pi$ radians so that the resultant lock-in error over two successive dither cycles or biasing-reversal cycles becomes substantially zero (the polarity of the second derivative corresponds to the same polarity of dither angle in the mechanical embodiment). Accordingly, the lock-in error associated with the sensor output is substantially reduced to zero. A closed-loop control scheme for implementing the closed-loop biasing system shown in FIG. 8 is graphically shown in FIG. 9. For purposes of discussion, a mechanical biasing system is again used for exposition purposes, although an electrically operated biasing system as already described could equally be used. The biasing means in the discussion which follows is again considered to be an electro-mechanical device and the coupling means 31 comprises one or more leaf springs, or other similar coupling means, whereby the laser gyro 100 oscillates back and forth about the gyro input axis 26, constituting dither motion. Such a system is again assumed to be a high-Q spring mass system as discussed earlier.

Suppose there exists some constant input base motion rate, and some constant rate of growth of dither angle amplitude as follows: Let the input base motion rate be R counts per dither cycle, and let the amplitude growth be M counts per dither cycle. Then, a perfect sinusoidally dithered gyro as described in U.S. Pat. No. 3,373,650 will exhibit, over two cycles, the following successive maximum and minimum input phase angle amplitudes, $A_1/A_3$, and $A_2/A_4$, respectively.

$$A_1 = P - \tfrac{1}{4}(R + M)$$

$$A_2 = N + \tfrac{1}{4}(R - M)$$

$$A_3 = P + \tfrac{1}{4}(R+M)$$

$$A_4 = N + \tfrac{3}{4}(M-R)$$

Where P and N represent the nominal maximum positive and negative dither angle amplitudes in counts.

Figure 9:
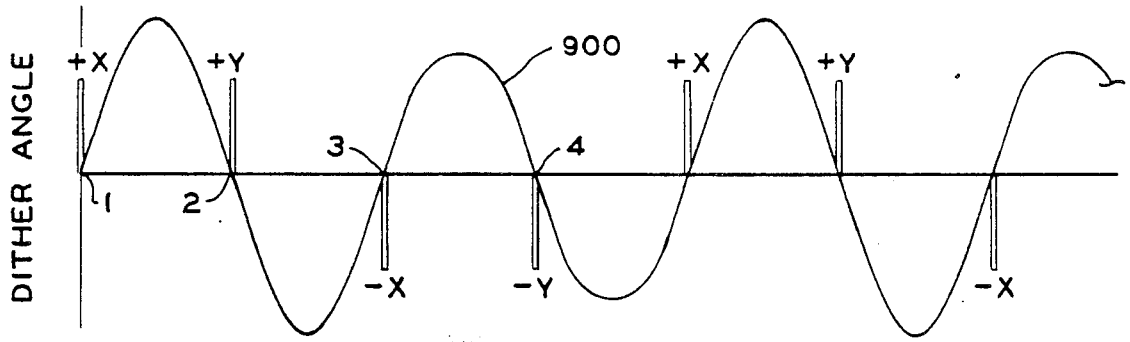
FIG. 9 is a graphical representation of synchronous bias control signal pulses and dither motion.

Now, suppose that pulsing is applied as shown in FIG. 9, where the pulse magnitudes, X and Y, will cause permanent increases in the dither angle amplitude of magnitudes X and Y. This would approximately be the situation if the biasing system is a high-Q spring mass system as previously assumed.

As illustrated in FIG. 9, X and Y pulses are applied synchronously with the two dither cycles. A pulse of amplitude "+X", is applied at point 1, the start of the first positive dither cycle, and a pulse of amplitude "−X" is applied at point 3, the start of the second successive positive dither cycle. Further, a pulse of amplitude "+Y" is applied at point 2, the start of the negative portion of the first dither cycle, and a pulse of amplitude "−Y" is applied at point 4, the start of the negative portion of the second successive dither cycle. In a high-Q spring mass system, as described earlier, and without any perturbations or random errors, the dither motion will exhibit peak amplitudes which will alternate between values which differ by a chosen value depending upon the magnitude of pulses X and Y. If X and Y are properly chosen, the instantaneous phase angle between the two beams can be made to differ by a predetermined amount, e.g., by $\pm\pi$ radians for two successive zero rate crossings of the same polarity of $d^2\psi/dt^2$ (same dither angle polarity).

The four successive maximum amplitudes designated earlier as $A_1$, $A_2$, $A_3$, and $A_4$, at the four successive zero rate crossings when combined with the X and Y pulses will then become mathematically:

$$A'_1 = P - \tfrac{3}{4}(R + M) + X \quad (25)$$

$$A'_2 = N + \tfrac{1}{4}(R - M) + X - Y$$

$$A'_3 = P + \tfrac{1}{4}(R + M) + (X - Y - X) = P + \tfrac{1}{4}(R + M) - Y$$

$$A'_4 = N + \tfrac{3}{4}(M - R) + (X - Y - X + Y) + N + \tfrac{3}{4}(M - R)$$

Applying the principles of the invention, as discussed earlier, where the accumulated gyro output angle error, E, can be substantially reduced to zero for two successive dither cycles if their maximum amplitudes differ by $\tfrac{1}{2}$ of a count, the relationship between the maximum amplitudes $A'_1$ and $A'_3$, and $A'_2$ and $A'_4$ are:

$$A'_3 = A'_1 - \tfrac{1}{2} \quad (26)$$

$$A'_4 = A'_2 - \tfrac{1}{2}$$

Solving for X and Y in equation (25) with the above conditions holding true:

$$X + Y = M + R + \tfrac{1}{2} \quad (27)$$

$$X - Y = M - R + \tfrac{1}{2}$$

From which:

$$X = M + \tfrac{1}{2}, \text{ and} \quad (28)$$

$$Y = R$$

Note that the amplitude of the X and Y pulses don't need to have a wide range of variation, because their strengths can be changed by any integral number of counts, it is only their fractional parts that matter. Thus, a range in magnitude of X and Y of $-\tfrac{1}{2}$ to $+\tfrac{1}{2}$ count is sufficient.

Suppose, then, that X and Y pulse amplitudes are modulated so as to hold true the equalities shown in equation (27) for any inertial input motion, and/or any rate of dither angle amplitude change. It remains to determine suitable error signals with which to modulate the X and Y pulse generators. Specifically, suppose that X and Y are in error by amounts "x" and "y" so that equations (28) change to:

$$X = M + \tfrac{1}{2} + x \quad (29)$$

$$Y = R + y$$

yielding:

$$A''_1 = P + \tfrac{1}{4}(M - 3R) + \tfrac{1}{2} + x \quad (30)$$

$$A''_2 = N + \tfrac{3}{4}(M - R) + x - y + \tfrac{1}{2}$$

$$A''_3 = P = \tfrac{1}{4}(M - 3R) - y$$

$$A''_4 = N + \tfrac{3}{4}(M - R)$$

resulting in:

$$A''_3 - A''_1 = -\tfrac{1}{2} - (x + y) \quad (31)$$

$$A''_4 - A''_2 = -\tfrac{1}{2} - (x - y)$$

and no longer being the equalities expressed in equation (26) because of the modulation errors "x" and "y" introduced. Taking the sine of both sides of equations (31) yields:

$$\operatorname{Sin} 2\pi(A''_3 - A''_1) = \operatorname{Sin} 2\pi(x + y) \quad (32)$$

$$\operatorname{Sin} 2\pi(A''_4 - A''_2) = \operatorname{Sin} 2\pi(x - y)$$

Since $A = I$ or $\theta + \tfrac{1}{2}$, and using the equality of equation (4), $$A''_1 = C_1 - E + \tfrac{1}{2}$$

$$A''_2 = -C_2 + E + \tfrac{1}{2}$$

$$A''_3 = C_3 - E + \tfrac{1}{2}$$

$$A''_4 = -C_4 + E + \tfrac{1}{2}.$$

where $C_1$, $C_2$, $C_3$, and $C_4$ represent the instantaneous gyro output phase angles, in counts, at the four successive zero rate crossings. Substituting into equations (32) we have:

$$\operatorname{Sin} 2\pi(C3 - C1) = \operatorname{Sin} 2\pi(x + y) \quad (32a)$$

$$\operatorname{Sin} 2\pi(C4 - C2) = \operatorname{Sin} 2\pi(y - x) \quad (32b)$$

and expanding, we obtain:

$$(\operatorname{Sin} 2\pi\, C3)(\operatorname{Cos} 2\pi\, C1) - (\operatorname{Cos} 2\pi\, C3)(\operatorname{Sin} 2\pi\, C1) = \quad (33)$$

$$\operatorname{Sin} 2\pi(x + y)$$

$$(\operatorname{Sin} 2\pi\, C4)(\operatorname{Cos} 2\pi\, C2) - (\operatorname{Cos} 2\pi\, C4)(\operatorname{Sin} 2\pi\, C2) =$$

$$\text{Sin } 2\pi (y - x)$$

The expressions presented in equation (33) provide a pair of simultaneous equations for determining the error variables, "x" and "y" dependent upon the trigonometric quantities, sine and cosine, of the instantaneous phase angle between the two counter-traveling beams of light at the four successive zero rate crossings. The trigonometric values of $C_1$, $C_2$, $C_3$, and $C_4$ are obtainable at the output of detectors 22a and 22b, as shown in FIG. 1, with these detectors separated by ¼ of a fringe spacing. With this spacing, one detector represents the sine of the instantaneous gyro output phase between the beams of light while the other represents the cosine thereof. Of course, some tolerance exists on the ¼ of a fringe spacing which would constitute some small but negligible error.

Assume now that the output of detector 22a represents the sine of the phase angle between the two beams, and the output of detector 22b represents the cosine of the same phase angle. Let the outputs be represented by:

$$U_n = A \text{ Sin } 2\pi(C_n + \alpha)$$

$$V_n = B \text{ Cos } 2\pi(C_n + \beta)$$

where n is the amplitude number 1, 2, 3, 4 at successive zero rate crossings.

Nominally, $A = B$, and $\alpha = \beta$ where A and B represent some attention or gain value of detectors 22a and 22b, and $\alpha$ and $\beta$ is representative of the phase angle tolerance of the ¼ fringe spacing. Consider, the discriminant functions $U_3V_1 - U_1V_3$, and $U_4V_2 - U_2V_4$, with no restrictions on A, B, $\alpha$, $\beta$.:

$$S_1 = U_3V_1 - U_1V_3 = AB(\text{Sin } 2\pi (C3 + \alpha)\text{Cos } 2\pi (C1 + \beta) -$$
$$\text{Sin } 2\pi (C1 + \alpha)\text{Cos } 2\pi (C3 + \beta))$$

$$S_2 = U_4V_2 - U_2V_4 = AB(\text{Sin } 2\pi (C4 + \alpha)\text{Cos } 2\pi (C2 + \beta) -$$
$$\text{Sin } 2\pi (C2 + \alpha)\text{Cos } 2\pi (C4 + \beta))$$

These reduce to:

$$S_2 = AB \text{ Sin } 2\pi(C3 - C1) \text{ Cos } 9\pi(\alpha - \beta)$$

and $$S_2 = AB \text{ Sin } 9\pi(C4 - C2) \text{ Cos } 2\pi(\alpha - \beta)$$

Substituting equations (32a) and (32b):

$$S_1 = AB \text{ Cos } 2\pi(\alpha - \beta)\text{Sin } 2\pi (C3 - C1)$$
$$= AB \text{ Cos } 2\pi(\alpha - \beta)\text{Sin } 2\pi (x + y)$$
$$S_2 = AB \text{ Cos } 2\pi(\alpha - \beta)\text{Sin } 2\pi (C4 - C2)$$
$$= AB \text{ Cos } 2\pi(\alpha - \beta)\text{Sin } 2\pi (y - x)$$

Now, assuming "y" and "x" to be fairly small, we may write:

$$S_1 = K(x+y)$$

$$S_2 = K(y-x)$$

where K denotes $2\pi AB \text{ Cos } 2\pi(\alpha - \beta)$ Hence, $$x = (S_1 - S_2)/2K$$

$$y = (S_1 + S_2)/2K \qquad (34)$$

Since "x" and "y" represent the errors in X and Y, we must subtract "x" and "y" from X and Y, to get proper pulsing amplitudes X and Y so that the equalities expressed in equation (27) are held true so that the accumulated gyro output angle error over two successive dither cycles is substantially zero.

$$X' = X - x$$
$$= X - (S_1 - S_2)/2K$$
$$Y' = Y - y$$
$$= Y - (S_1 + S_2)/2K$$

This means that X and Y are maintained at constant values for zero error signals, and are otherwise modified by adding or subtracting increments as dictated by the error signals, "x" and "y" for modulating the pulsing amplitudes X and Y.

Note that error signals $S_1$ and $S_2$ have trigonometric multivalue ambiguity namely: they vanish not only when the two amplitudes ($C_3$, $C_1$ in the case of $S_1$, and $C_4$, $C_2$ for $S_2$) differ by ½ count, but also when the two amplitudes are equal. In other words, a zero error signal for "x" and "y" is also returned when there is a ½ count error. Thus, we need, on occasion, to augment the error signal by ½ count. This ambiguity can be discerned by adding another analog computation, namely:

$$G = |U_1 + U_3| + |V_1 + V_3|$$

$$H = |U_2 + U_4| + |V_2 + V_4|$$

If G exceeds some threshold value (say, $G > \frac{1}{2}(A + B)$), we add ½ count to $S_1$, and likewise with H and $S_2$.

Shown in FIG. 10 is a more detailed block diagram than FIG. 8 showing a closed-loop error cancelling biasing system employing the principles of the invention. The closed-loop error cancelling biasing system diagrammatically shown in FIG. 10 functions in a manner similar to the biasing system shown in FIG. 8, and utilizes the control scheme as described with reference to FIG. 9 and the control description which follows equation (25) above. The closed-loop biasing system of FIG. 10 is again assumed to be an electro-mechanical biasing system exhibiting a high-Q spring mass system similar to that shown in FIGS. 5 and 8. In FIG. 10, ring laser gyro 800 is mechanically biased by biasing means 30 through coupling means 31. Biasing means 30 is directed by the bias control signal provided by bias control signal generating means 832. The closed-loop biasing system in FIG. 10 includes an error signal means 900 responsive to the gyro output phase angle relationship between the two counter-traveling beams of light in laser gyro 800 presenting error signals to bias control signal generating means 832 whereby a closed-loop control system is provided.

Bias control signal generating means 832 is shown comprised of a summing means 836 summing output signals from sinusoidal dither signal means 834 similar to first signal means 34 in FIG. 3, and X-pulsing means 835 and Y-pulsing means 837. X-pulsing means 835 and Y-pulsing means 837 provide pulsing signals which are summed by summing means 836 with the signal provided by dither signal means 834. The output of summing means 836 provides a bias control signal from bias control signal generating means 832 for directing biasing means 30.

Bias signal generating means 832 receives error signals from error signal means 900. Error signal means 900 includes signal processor 875, sample and hold gates 804a and 804b, and signal storage means 807a and 807b. Signal processor 875 is responsive to the gyro output phase angle between the two counter-traveling beams of light for processing phase angle data and presenting output error signals "x" and "y" for modulating X-pulsing means 835 and Y-pulsing means 837 respectively, as will be described in more detail below.

The biasing system in FIG. 10, like that of FIG. 8, requires the value of the phase angle, $\psi$, between the two counter-traveling beams of light at substantially the zero rate crossing. Further, the control scheme used in FIG. 10 and described above utilizes the sine and cosine values of the phase angle at the zero rate crossing as aforesaid. In FIG. 10, laser gyro 800, similar to laser gyro 100 in FIG. 1, is provided with photodetectors 22a and 22b. Photodetectors 22a and 22b are separated by ¼ of a fringe spacing as discussed above and thus provide a phase angle detecting means having signals indicative of the sine and cosine of the phase angle between the two beams. The output of photodetectors 22a is coupled to window comparator 841 through time differentiator circuit means 845a, and the output of photodetector 22b is coupled to window comparator circuit 843 through time differentiator circuit means 845b. The outputs of window comparators 841 and 843 are logically combined by AND circuit 844. The combination of window comparators 841 and 843, differentiators 845a and 845b, and AND gate circuit 844 provide the function of phase angle rate detector means 802 described above with reference to FIG. 8, and will be described in more detail below.

As shown in FIG. 10, sample and hold circuits 804a and 804b of error signal means 900 are gated by the output of AND gate 844. The input to the sample and hold circuit 804a is provided by the output of photodetector 22a, and the input of sample and hold circuit 804b is provided by the output of photodetector 22b. The output of each of the sample and hold circuits 804a and 804b are fed into temporary storage circuits 807a and 807b respectively. The above sample and hold circuits and temporary storage circuits can be analog or digital circuits, or combinations thereof, well known in the art. For purposes of discussion, the output of sample hold circuits 804a and 804b are considered to be digital representations of the output of detectors 22a and 22b respectively. Storage circuits 807a and 807b are assumed to be ordinary digital memory circuits.

The outputs of the temporary storage circuits 807a and 807b are processed in signal processor 875 of error signal means 900. Signal processor 875 performs the computation as indicated in the discussion which follows equation (25) above for deriving output control error signals indicative of those designated "x" and "y". The "x" and "y" error signals are presented to the X-pulsing means 835 and the Y-pulsing means 837 respectively. Signals "x" and "y", as discussed above are the closed loop control error signals for modulating the magnitude of output pulsing signals provided by X-pulsing means, 835, and Y-pulsing means 837 and will be further described.

Window comparators 841 and 843 are similar and thus only window comparator 841 will be described. Shown in FIG. 10a is one embodiment for implementing a window comparator. Referring now to FIG. 10a, window comparator 841 is comprised of comparators 842a and 842b. Comparators 842a and 842b can be ordinary operational amplifiers or other such devices used as simple comparators for comparing levels of two signals. Comparator 842a is shown having the output of differentiator 845a connected to the positive input of comparator 842a and also connected to the inverting input of comparator 842b. The inverting input of comparator 842b is connected to a reference voltage "+" and the non-inverting input of comparator 842b is connected to a reference voltage "−". The outputs of comparators 842a and 842b are combined by logical NOR-gate 846.

The operation of window comparator, 841, will now be described. As long as there exists a continually changing phase of sufficient rate (d$\psi$/dt) between the beams of light, the output of phase differentiator 845a will either be positive or negative and have a magnitude greater than a preselected value such as $\epsilon$, a substantially small quantity. In this situation, the output of one or the other, but not both, of comparators 842a and 842b will be a high voltage level corresponding to a logical one. The output of NOR-gate 846 provides a logical "0" in this situation. On the other hand, during a zero rate crossing d$\psi$/dt is zero and the output of differentiator 845a will drop below the value of $\epsilon$, either positive or negative, and both comparators 842a and 842b will have a low voltage level corresponding to a logical "0". In this situation the output of the NOR-gate 846 will become a logical one.

Window comparator 843 is shown connected to the output of phase differentiator 845b, responsive to the output of photodetector 22b, and will behave in a similar way as that described with respect to window comparator 841. That is, the output of window comparator 843 will be a logical "0" whenever the rate of change of phase angle between the beams of light is greater than the threshold of the window comparator 843, and will be a logical "1" when the rate of change of phase angle is less than the threshold $\epsilon$.

The operation of the closed-loop biasing system shown in FIG. 10 will now be described. Assuming that photodetectors 22a and 22b are separated by approximately ¼ of a fringe spacing, the output of photodetector 22a can be considered to be the sine of the phase angle between the two counter-traveling beams of light, and the output of detector 22b can be considered to be representative of the cosine of the phase angle between the same two beams of light.

At a zero rate crossing, the outputs of both comparators 841 and 843 will be a logical "1". This is so since the time rate of change of the phase angle is zero, and therefore will be a value between "+" and "−" $\epsilon$ as indicated earlier. In this situation, the output of AND gate 844 will be a logical "1" since each of the outputs of window comparators 841 and 843 are a logical "1". Otherwise, the output of AND gate 844 is a logical "0" in all other situations, assuming a constantly applied dither motion. When the output of AND gate 844 changes from a logical "0" to a logical "1", the sample and hold circuits 804a and 804b are gated, and whatever is at the input thereof, will be sampled and held temporarily until the next gating occurs which would occur at the next zero rate crossing. Thus, the sample and hold circuits sample the output of both photodetectors 22a and 22b representing the sine and cosine respectively of the phase angle between the beams of light at the occurrence of each zero rate crossing. The output of sample and hold circuits 804a and 804b are stored in temporary storage circuits 807a and 807b respectively for appropriate signal processing by signal processor 875.

Signal processor 900 combines the instantaneous phase angle outputs from detectors 22a and 22b at successive zero rate crossings providing output control error signals "x" and "y" in a manner as described with reference to equation (34). Signal processor 875 can be any analog or digital system which can provide the mathematical computation as described with respect to the solution of the simultaneous equations as set forth in discussion above relative to equation (33).

In the continuing discussion, it is important to distinguish between the "polarity" of successive zero rate crossings, each associated with an instantaneous phase angle between the two counter-traveling beams of light in each portion of the dither cycle. Successive positive zero rate crossings thereof, hereafter, refers to those crossings in which $d^2\psi/dt^2$ is positive, and negative zero rate crossings, hereafter, refers to those instances in which $d^2\psi/dt^2$ is negative. In a mechanical biasing system, positive and negative zero rate crossings correspond to those instances when the direction of rotation changes from a first direction to a second direction, and the direction of rotation changes from the second direction to the first direction, respectively. Referring to FIG. 9, for example, successive positive zero rate crossings correspond to dither angle amplitudes $A_1$ and $A_3$, and successive negative zero rate crossings correspond to dither angle amplitudes $A_2$ and $A_4$.

Consider the operation of the closed-loop biasing system of FIG. 10 in the situation when there is no inertial input motion and bias control signal generating means 832 provides a bias control signal directing operation of the biasing means 30 so that the instantaneous phase angle between the two beams of light at each of two successive zero rate crossings of the same sign (i.e. positive or negative zero rate crossings) differ, fractionally, by exactly ½ a count, or $\pm\pi$ radians. In this situation, the output signals "x" and "y" would be zero and the X-pulsing means 835 and the Y-pulsing means 837 would remain constant and operate as already described with reference to FIG. 3 and equations associated therewith in which the accumulated gyro output angle error is substantially zero.

Now consider the response of the closed-loop biasing system in FIG. 10 in the situation when some inertial input motion is present in the system. In this situation the instantaneous phase angle between the two beams of light between two successive zero rate crossings of the same sign are no longer differing by $\pm\pi$ radians. In this instance, the output of the signal processing means 900 will quickly provide appropriate "x" and "y" signal values to modulate the value of X and Y of X-pulsing means 835 and Y-pulsing means 837 so the values of "x" and "y" are again reduced to zero. Thus, "x" and "y" provide the closed-loop error signals required for closed-loop operation of a biasing system for a laser gyro so that the phase angle between the beams of light for successive zero rate crossings of the same sign differ by $\pm\pi$ radians resulting in the total accumulated error over two dither cycles to be reduced to substantially zero. This, of course, means that the lock-in error associated with the sensor output is also substantially reduced to zero.

It should be noted that the control scheme described by equations (25) through the end and incorporated in the embodiment shown in FIG. 10 is only exemplary of a variety of control schemes possible to obtain the intended function of a feedback biasing system for practicing the principles of the invention. Specifically, the combination of error signal means 900 and bias control signal generator means 832 must provide control of the resultant instantaneous phase angle at clockwise peak phase angles and counterclockwise peak phase angles based on previous occurring values of the same. Error signal means 900 and the control scheme applied therein force successive values of zero rate crossings to have predetermined values in accordance with equation (19) so as to substantially reduce lock-in in the output signal normally associated with the ring laser gyro. Further, although the embodiments of the invention have been described utilizing mechanical biasing techniques, electrical/optical techniques can also be employed in practicing lock-in error reduction as aforesaid. Lock-in error reduction in the foregoing embodiments have generally been described utilizing zero rate crossing phase angle information, however, other selected phase rate points may also have been selected and is within the scope of the present invention.

Briefly summarizing, the lock-in error characteristic of dithered or reversibly biased ring laser angular rate sensors can be substantially cancelled by controlling the instantaneous phase difference between the two counter-traveling beams of light at successive zero rate crossings. Specifically, in the class of mechanically biased systems, the instantaneous phase difference can be manipulated by altering the peak or maximum clockwise and counterclockwise amplitudes of the induced rotational oscillations provided by the biasing means. FIG. 8 showed a closed-loop control system where the actual phase angle at the zero rate crossing is detected and is utilized as the input and synchronization for the closed-loop control system. FIG. 10 showed a detailed embodiment for the implementation of FIG. 8 where the biasing means for rotating the ring laser sensor, back and forth, was provided with a signal for causing sinusoidal motion, plus a series of synchronized pulses to obtain the desired control of the phase angle at the zero rate crossings.

Figure 12:
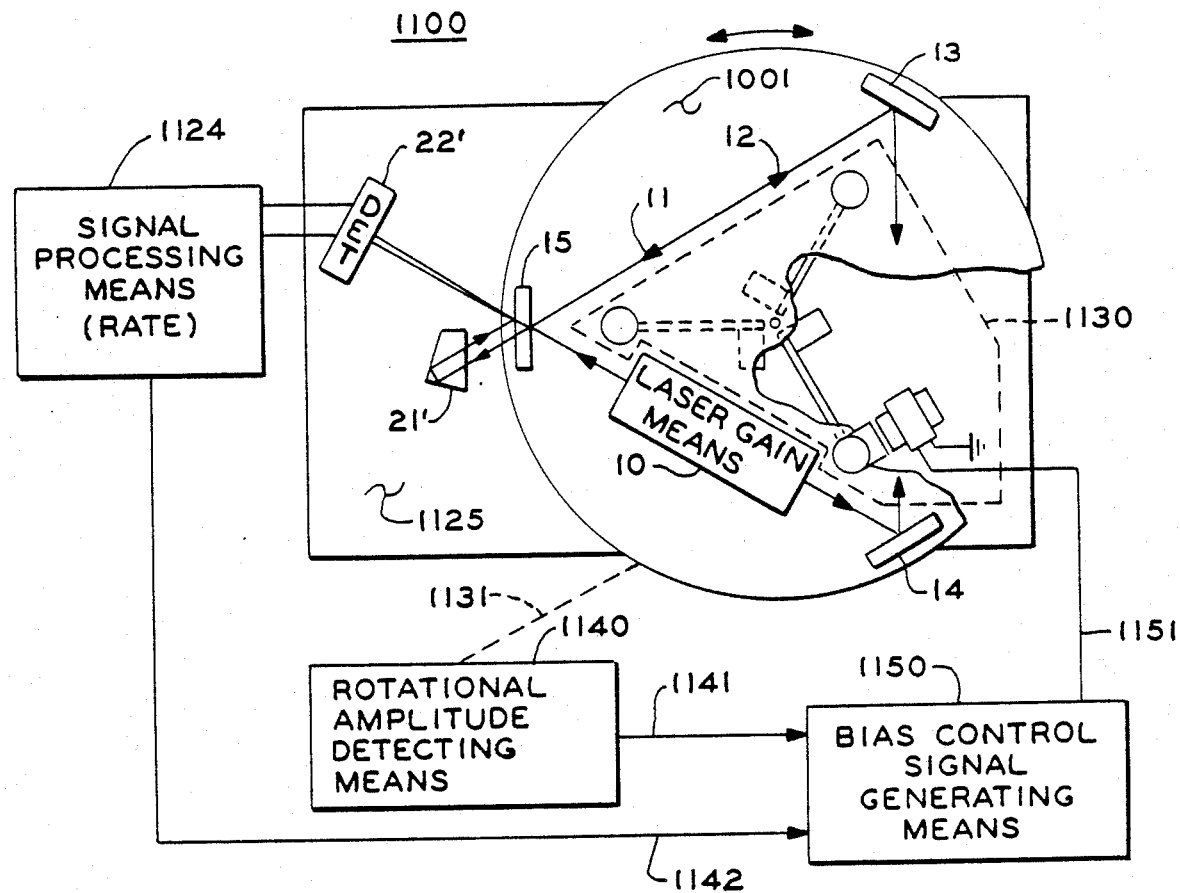
FIG. 12 is a block diagram of another closed-loop feedback biasing arrangement employing the principles of the invention.
Figure 13:
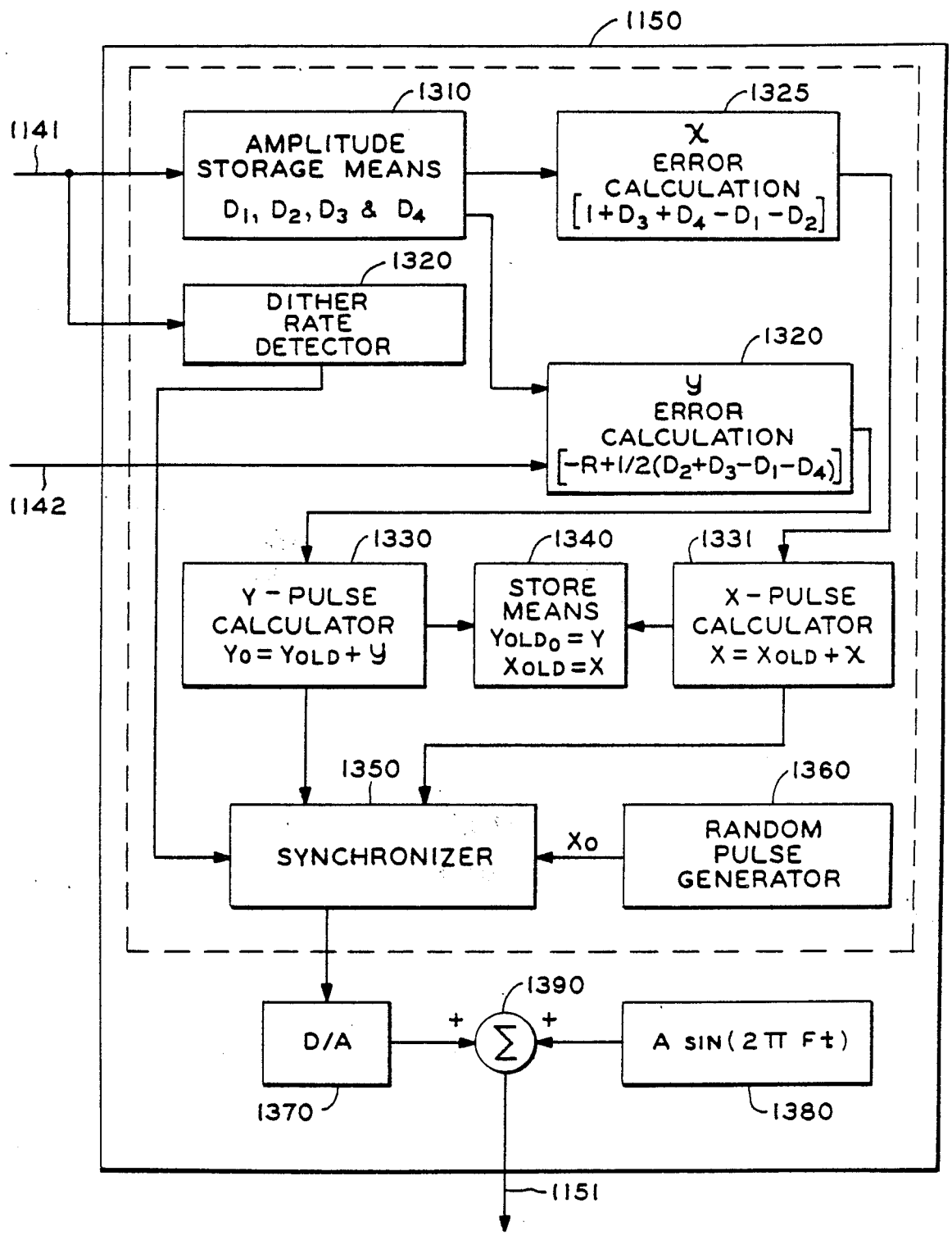
FIG. 13 is a detailed embodiment of the bias control signal generating means of FIG. 12.

Shown in FIGS. 12 and 13 is a ring laser angular rate sensor system which provides substantially the same closed-loop control error cancelling biasing as provided by the system shown in FIGS. 8 and 10. However, the system shown in FIGS. 12 and 13 does not require phase angle information directly from phase angle monitoring systems, but utilizes a combination of rate information signals and bias information signals as will now be described.

Shown in FIG. 12 is a ring laser angular rate sensor 1100 which is substantially that as shown in FIG. 1 except the detector components including the detector 22 and combiner prism 21, shown in FIG. 1, are isolated from the ring laser portion of the sensor. In FIG. 12, similar functioning components as those of FIG. 1 have retained the same numeral designation. The supporting means 1101 supports the propagating waves 11 and 12 supplied by lasing medium 10 about the closed-loop path defined by mirrors 13, 14 and 15. Fixed to a base 1125 is combiner prism 21' and detector 22'. The output of detector 22 is presented to signal processing means 1124 which provides an output signal indicative of the rate of rotation of the entire angular rate sensor system 1100 consisting of supporting means 1101 and base means 1125 and their associated components.

Coupled to support means 1101 and base 1125 is rotation oscillating means 1130 for oscillating support means 1101 relative to base means 1125 in a rotational mode substantially about a reference axis (not shown) defining a pivot axis which is substantially parallel to input axis 26.

The system of FIG. 12 so far described is essentially that shown in U.S. Pat. No. 3,373,650, and is sometimes referred to as a case mounted readout ring laser gyro system. In such systems the signal processing means 1124 will provide a signal indicative of the rate of the entire system 1100 but which usually excludes the rotational motion induced by rotation oscillating means 1130. A system of this type is well known in the art.

Additionally shown in FIG. 12 is rotational amplitude detecting means 1140 having output signals which are presented to bias control signal generating means 1150 through connecting means 1141. Also presented to bias control signal generating means 1150 is the output signal of signal processing means 1124 through connecting means 1142. The output of bias control signal generating means 1150 provides the bias control signal for rotation oscillating means 1130 through connecting means 1151.

Rotation amplitude detection means 1140 is responsive to the rotational motion of the supporting means 1101 relative to the base 1125 for producing signals indicative of the value of clockwise and counterclockwise rotation amplitudes about a fixed reference axis which is arbitrarily defined as the non-motion reference, i.e. no induced rotational oscillations.

Bias control signal generating means 1150, as will be described below, provides the bias control signal by combining the output of signal processing means 1124, providing rate information, and the output of rotation amplitude detecting means 1140, providing rotational motion information, in such a manner as to control the rotation oscillating means 1130 so as to precisely control successive zero rate crossing phase angles in a similar manner as that already described so as to provide error cancelling bias.

As already indicated, one type of biasing means such as rotation oscillating means 1130 is substantially shown in U.S. Pat. No. 3,373,650. The support means 1101 is attached to the base means 1125 through one or more springs 1131 or torsion means so that the sensor 1100 is essentially a high-Q spring-mass system. In such high-Q systems, rotation is produced, by way of example, with essentially a transducer 1132, such as a piezoelectric device, coupled to the springs to flex the springs. The transducer is responsive to an electrical control signal for flexing the spring to cause rotational motion of the supporting means 1101 relative to base 1125. Pulses applied to transducer 1132 of rotation oscillating means 1130 will effectively cause many cycles of rotational oscillations because the system is a high-Q spring-mass system. Each pulse will produce a very lightly damped sinusoidal ringing. If the pulse is synchronously applied, the peak amplitude following the pulse can be controlled and is substantially shown in the analysis following equation (24) through equation (28).

Consider, again, induced rotational oscillations like that shown in FIG. 9. The signal applied to the rotation oscillating means 1130 is such that the sensor sinusoidally dithers at a first frequency by a first component of a control signal applied to the rotation oscillating means. A second component of the applied control signal is provided by a series of X-pulses alternately applied in combination with a second series of Y-pulses at points 1, 2, 3 and 4 synchronized with the sinusoidal dither at the first frequency.

Consider now the operation of the rotation oscillations produced by the following applied series of pulses:
 (a) Randomize the pulse amplitude applied at point 1. (FIG. 9)
 (b) Apply pulse $+Y$ at point 2.
 (c) Add pulse $-X$ at point 3.
 (d) Add pulse $-Y$ at point 4.
 (e) Repeat (a) through (d) above.

For lock-in error cancelling bias, the required values of the magnitude of X and Y are those described in equation (28) and presented again here:

$$X = M + \tfrac{1}{2}, \text{ and } Y = R \tag{28}$$

where
 M = rate of increase of dither amplitude (peak clockwise and counterclockwise amplitude of induced rotational oscillations.
 R = sensor system turning rate.

The above is expressible as an error-correction control scheme in which X and Y pulse magnitudes are adjusted for the next two-cycle dither period based on observations of rate and induced dither rotations made during the preceding two cycles. This scheme can be mathematically described by:

$$X(\text{new}) = X(\text{last}) + x \tag{101}$$

$$Y(\text{new}) = Y(\text{last}) + Y \tag{102}$$

where:

$$x = (\tfrac{1}{2})(1 + D3 + D4 - D1 - D2)$$

and $$y = -R + (\tfrac{1}{2})(D2 + D3 - D1 - D4)$$

D1 and D3 denote the magnitude of two successive peak clockwise amplitudes, and D2 and D4 denote the magnitude of two successive peak counterclockwise amplitudes seen over the preceding two dither cycles as detected by the rotational amplitude detecting means 1140. R denotes the input rate determined from the normal fringe pattern readout means provided by detector 22' and signal processing means 1124. Note that the error terms x and y are similar to the error terms shown in equation (31) which are a function of the input angle amplitudes, and can be equated to the zero rate crossings, the C's.

As indicated in the mathematical analysis following equation (24), such a system will provide error cancelling bias. As indicated earlier, the error cancelling biasing consists of forcing the phase angle between the beams of light for successive pairs of zero rate crossings of the same sign direction to differ by $\pm\pi$ radians resulting in the total accumulated error over two dither cycles to be reduced to substantially zero. This, of course, means that the lock-in error associated with the sensor output is also substantially reduced to zero. In the absence of inertial input rotation to the sensor system 1100, R being zero, the X pulse following the random pulse, defined by equation (28) produces the phase angle difference of the two successive zero rate crossings to be the selected value of $\pm\pi$ radians. Perturbations in the dither amplitude in accordance with the above control scheme will be corrected by "x" which is based on the system response to the past value of the X pulse. On the other hand, system perturbations including the presence of inertial input rotation of the sensor 1100 are compensated by the value of the Y pulses as defined by equation (28). System perturbations which alter the desired effect of the Y pulse are corrected by "y" which is based on the system response to the past value of the Y pulses.

A more detailed embodiment of the bias control signal generating means of the system shown in FIG. 12 is shown in FIG. 13.

Bias control signal generating means 1150 is comprised of amplitude storage means 1310, dither rate detector 1320, "x"-error calculator 1325, "y"-error calculator 1326, Y-pulse calculator 1330, x-pulse calculator 1331, storage means 1340, synchronizer 1350, random pulse generator 1360, digital to analog converter 1370, sine function generator 1380, and summing means 1390. As is well known to those skilled in the art, portions of many of the blocks shown in FIG. 13 can be performed by one or more portions of a computer and/or a combination of analog and digital circuits, and/or a microprocessor.

The output of rotation amplitude detecting means 1140 is a signal indicative of the angular displacement about the rotational reference axis between supporting means 1101 and base 1125. This signal is representative of the magnitude and sign about a zero or steady state reference axis. This information can be provided by a variety of transducers coupled to system 1100 through coupling means 1135. The output of rotation amplitude detecting means 1140 is presented to amplitude storage means 1310 and dither rate detector 1320. The output of dither rate detector 1320 is presented to synchronizer 1350 and amplitude storage means 1310. The dither rate detector 1320 is essentially a differentiation circuit responsive to the output of amplitude detecting means 1140. In operation the dither rate detector detects the zero rate or turnaround point of the dither motion, that is, when the dither rotation changes direction. At the instant of change in direction, the amplitude storage means appropriately stores the value of the angular displacements at the turnaround instant, and sequentially stores the four successive values, i.e. two peak clockwise amplitude values and two peak counterclockwise amplitude values. At the same time, the output of dither rate detector 1320 is presented to synchronizer 1350 so that pulses X and Y are synchronized with the dither turnaround instances. More specifically, the pulses are intended to be applied midway between the occurrence of a peak amplitude and an ensuing occurrence of another peak amplitude of different sign direction.

The output of amplitude storage means 1310 is presented to "x"-error calculator 1325 and "y"-error calculator 1326. The "y"-error calculator 1326 also receives rate information from signal processing means 1124 which is a signal indicative of the rate, R. The "x"-error calculator 1325 and "y"-error calculator 1326 performs the mathematical computations substantially described by equations (103) and (104). The output of "x"-error calculator 1325 is presented to X-pulse calculator 1331 which performs the mathematical function as mathematically described by equation (101); and the output of "y"-error calculator 1326 is presented to the Y-pulse calculator 1330 and performs the mathematical function as described by equation (102). The values of the X-pulse and Y-pulse calculators 1331 and 1330 respectively are stored in storage means 1340 for storing the values of X and Y for subsequent calculations in another processing cycle, here called X (last) and Y (last).

Synchronizer 1350 is presented with inputs representative of the Y-pulse calculation, the X-pulse calculation and the random pulse value supplied by the random pulse generator 1360. Synchronizer 1350 synchronously connects tthe values determined by the X-pulse calculator 1331, Y-pulse calculator 1330, and the random pulse generator 1360 to a digital to analog converter 1370 for subsequent presentation as component parts of the bias control signal to rotation oscillating means 1130 through summing means 1390. Summing means 1390 sums the pulses provided by the output of the digital to analog converter 1370 to signals provided by sine function generator 1380 for sinusoidally dithering the support means 1101 relative to 1125 at a substantially constant amplitude and first frequency, the first frequency being substantially the resonant frequency of the spring-mass system.

Note that sine function generator 1380 represents the sinusoidal drive signal, part of the bias control signal, for maintaining an oscillatory rotation of the spring-mass system comprising sensor 1100. Block 1380 can be a variety of systems for causing such motion. Particularly, it is well known to take the output of the rotation amplitude detection means through a closed-loop feedback control system for amplification and phase shifting to maintain such oscillations. Systems such as these are well known in the art.

The operation of the closed-loop error cancelling bias provided by the systems shown in FIGS. 12 and 13 will now be described. Consider the operation of two dither cycles substantially shown in FIG. 9 with the series of pulses, as aforesaid, where the first pulse in every two dither cycles is random, and that the system has been running for sometime. The synchronizer allows the value provided by the random pulse generator 1360 to be applied at point 1 in combination with the sinusoidal signal which oscillates or dithers the laser gyro system 1100. Prior to the application of the "+Y" pulse at point 2, the amplitude storage means contains information of the previous two peak clockwise dither amplitudes represented by D1 and D3 and the previous two peak counterclockwise dither amplitudes represented by D2 and D4. The values of these amplitudes were determined at the instances when the dither rate detector determined the turnaround points in the two previous dither cycles (dither rate=0). The "x"-error calculator can conduct its calculation, and similarly the "y"-error calculation then can be conducted with the value of the rate information. The Y-pulse calculator 1330 then adds the value of the previously applied magnitude of Y, Y (last), which was applied in the previous two dither cycles to the value of the y-error calculation. The magnitude of this pulse will be applied at points 2 and 4 except with opposite polarity as noted in FIG. 9. In a similar manner the X-pulse calculator 1331 will compute the value of the next X-pulse to be applied at point 3 based on the previous value of X applied at point 3, stored in X (last), in the preceding two dither cycles to the value determined by the x-error calculation. The values determined by the Y-pulse calculator 1330 and the X-pulse calculator 1331 are then stored in storage means 1340, denoted by Y (last) and X (last) respectively, for the next determination of pulses in the following two dither cycles. This process continually repeats itself.

Although not shown in FIG. 13 is a central computing clock which controls the transfer of information from the plurality of calculating and storing blocks shown in FIG. 13 which is well known in the computer art.

Synchronizer 1350 receives input from the dither rate detector 1320, indicative of the turnaround instances of the dither motion. One example of a synchronizer 1350 is one which records the time between successive turnaround instances, that is the time between the clockwise peak amplitude or turnaround point and the counterclockwise peak amplitude or turnaround point so as to determine the time after the turnaround point that the appropriate pulse X or Y or random pulse generator should be applied. Note also that the sign function generator could equally be used as a means for the synchronization input through synchronizer 1350 instead of that supplied by dither rate detector 1320. In this case, a zero from the output of sine function generator 1380 is indicative of the point in time between induced peak rotation amplitudes when the pulses should be applied. Of course, there are many possibilities to synchronize the pulses with the turnaround instances.

Note that in some situations it may be desirable to offset the application of pulses X and Y and the random pulse signal from the midpoint between turnaround instances as that shown in FIG. 9. This may have an advantage of compensating losses and time delays in the overall system.

The embodiment shown in FIGS. 12 and 13 show how a closed-loop error cancelling bias system can be provided to control the phase angle between the beams of light for successive zero rate crossings of the same sign to differ by a predetermined value resulting in a total accumulated error over two dither cycles to be reduced to substantially zero without directly measuring the instantaneous phase angle between the two beams. That is, the system shown in FIG. 12 can combine rate information which is normally available in most ring laser gyros with information about the induced rotational oscillations provided by dithering mechanisms. It is, of course, possible to modify the error cancelling biasing system of the present invention so as to alter successive values of zero rate crossing of a group of dither cycles, greater than two cycles, where the total accumulated error over the group of cycles chosen is reduced to substantially zero. The system would require, of course, a different control signal for providing the appropriate bias to obtain the intended result. In the pulsing system shown, a different number of pulses would, of course, be required.

The error cancelling bias systems of the present invention provides control of the phase angle between the waves traveling about the ring laser closed-loop path in combination with the normally applied bias to reduce lock-in error in the gyro. Further arrangements for phase angle control can no doubt be devised without departing from the scope of the present invention.

The embodiments of the invention in which an exclusive property or right is claimed are defined as follows:

1. A ring laser angular rate sensor comprising:
    support means for supporting two counter-traveling waves of substantially monochromatic electromagnetic radiation substantially traveling about a closed-loop path, wherein the frequency of each of said waves is a function of the rate of rotation of said closed-loop path, and there being a corresponding phase relationship established between said waves also being a function of the rate of rotation of said closed-loop path;
    means responsive to said waves for providing a sensor signal related to the true angle of rotation of said closed-loop path;
    phase angle detector means, responsive to said waves for providing at least one output signal related to the instantaneous phase, $\psi$, of said phase relationship between said waves;
    biasing means responsive to a bias control signal, for varying the frequency of at least one of said waves and said corresponding phase relationship between said waves, said bias control signal capable of
      (i) periodically varying the frequency of at least one of said waves such that the frequency difference between said waves periodically alternates in sign, and
      (ii) affecting said phase relationship such that said phase, $\psi$, takes on selected phase values at selected occurrences of $d\psi/dt$ being zero; and
    bias control signal generating means for producing said bias control signal, said bias control signal generating means including,
      means responsive to said phase angle detector means at least one output signal for determining at least a first phase value of said phase relationship at an occurrence of a first selected value of $d\psi/dt$, and
      means responsive to said first phase value for determining at least one signal component of said bias control signal such that said bias control signal causes said biasing means to produce a second and a third phase value of said phase relationship at second and third subsequent occurrences of said selected value of $d\psi/dt$ such that said second phase value and said third phase value differ by a selected phase difference of substantially $\pi$ radians.

2. The apparatus of claim 1 wherein said phase angle detector means includes at least a first transducer adapted to provide an output signal in response to an interference pattern generated by optically combined portions of said two waves, said first transducer providing one of said phase angle detector means at least one output signal.

3. The apparatus of claim 1 wherein said bias control signal generating means includes:
    error signal means responsive to said phase angle detector means at least one output signal for generating at least a first error signal indicative of a first function of past phase values, including said first phase value;
    first means for generating a first signal component of said bias control signal for periodically varying said frequency of at least one of said waves such that the frequency difference between said waves periodically varies at a first frequency;
    second means responsive to said first error signal for generating a second component of said bias control signal to cause said phase, associated with selected subsequent pairs of successive occurrences of said selected values of $d\psi/dt$ having the same polarity of $d^2\psi/dt^2$, to take on first and second values, which differ by $\pi$ radians such that the lock-in error associated with said sensor signal is reduced.

4. The apparatus of claim 1 wherein said biasing means includes rotating means for mechanically oscillating said sensor in a rotational mode back and forth thereby periodically varying the frequency of at least one of said waves and thereby periodically alternate said sign of said frequency difference.

5. The apparatus of claim 1, wherein said bias control signal generating means includes means for periodically perturbing said bias control signal so as to cause said phase between said waves to periodically take on a random value.

6. In a dithered angular rate sensor of the class wherein two waves travel in opposite directions, each wave substantially traveling about a closed-loop path, wherein the frequency of each of said waves is a function of the rate of rotation of said closed-loop path, and there being a corresponding phase relationship established between said waves also being a function of the rate of rotation of said closed-loop path, and wherein said sensor generates a first sensor signal related to the true angle of rotation of said sensor but which includes lock-in error inherent in said sensor, the improvement comprising:
biasing means capable of altering the phase of said phase relationship such that phase values occurring at a pair of successive occurrences of $d\psi/dt$ being zero and $d^2\psi/dt^2$ being of the same polarity are such that said phase values differ by $\pi$ radians.

7. In an angular rate sensor of the class wherein two waves travel in opposite directions, each wave substantially traveling about a closed-loop path, wherein the frequency of each of said waves is a function of the rate of rotation of said closed-loop path, and there being a corresponding phase relationship established between said waves also being a function of the rate of rotation of said closed-loop path, and wherein said sensor generates a first sensor signal related to the true angle of rotation of said sensor but which includes lock-in error inherent in said sensor, the improvement comprising:
biasing means for
(i) periodically varying the frequency of at least one of said waves such that the frequency difference between the frequencies of said waves periodically alternates in sign, and
(ii) varying at least one of said waves such that the phase, $\psi$, of said phase relationship between said waves takes on a first value at a first occurrence of $d\psi/dt$ being zero and having a first polarity of the second derivative thereof, and said phase takes on a second value at a successive second occurrence of $d\psi/dt$ being zero and having the same polarity of the second derivative thereof as said first value occurrence, and in which said first and second values of said phase differ by substantially $\pi$ radians.

8. A ring laser angular rate sensor comprising:
means for generating two counter-propagating laser beams along a closed-loop path, wherein the frequency of each of said beams is a function of the rate of rotation of said closed-loop path, and there being a corresponding phase relationship established between said beams also being a function of the rate of rotation of said closed-loop path;
means responsive to said laser beams for generating a first sensor signal related to the true angle of rotation of said sensor but which includes lock-in error inherent in said sensor;

biasing means for producing, in response to a control signal, rotational oscillations of said closed-loop path, said bias control signal means including
(i) means for directing said rotational oscillations at substantially a first frequency, and
(ii) means for directing the peak clockwise and counterclockwise amplitude values of said rotational oscillations about a fixed reference axis so as to alter the phase $\psi$ of said phase relationship between said waves substantially at occurrences $d\psi/dt$ being zero; and
bias control signal generating means for producing said bias control signal to direct said biasing means to cause successive pairs of phase values occurring at those times when the $d\psi/dt$ is zero and the value of $d^2\psi/dt^2$ is of the same polarity to differ by $\pm\pi$ radians.

9. The apparatus of claim 8 wherein said bias control signal generating means includes:
means for providing a first signal component and said bias control signal for periodically varying the frequency of at least one of said waves so that the frequency difference between said waves periodically varies at said first frequency;
means for providing a second signal component of said bias control signal for periodically varying said frequency of at least one of said waves such that the frequency difference between said waves periodically varies at a second frequency different than said first frequency so that said successive pairs of phase values differ by said $\pi$ radians.

10. The apparatus of claim 9 wherein said second frequency is one half of said first frequency.

11. In an angular rate sensor of the class wherein two wave propagate in opposite directions, each wave substantially propagating about a closed-loop path, wherein the frequency of each of said waves in a function of the rate of rotation of said closed-loop path, and there being a corresponding phase relationship established between said waves also being a function of the rate of rotation of said closed-loop path, and wherein said sensor generates a first sensor signal related to the true angle of rotation of said sensor but which includes lock-in error inherent in said sensor, the improvement comprising:
biasing means capable of producing, in response to a bias control signal, rotational oscillations of said closed-loop path relative to a fixed reference axis so as to vary the frequency of each of said waves, and said corresponding phase relationship therebetween, in a manner to cause the sign of the frequency difference between said waves to periodically alternate, said bias control signal capable of
(i) directing said rotational oscillations at substantially a first frequency, and
(ii) directing the peak clockwise and counterclockwise amplitude values of said rotational oscillations about said fixed reference axis, each of said peak amplitudes having a corresponding instantaneous phase value of said phase relationship, associated therewith; and
bias control signal generating means for producing said bias control signal for directing said biasing means so that
(i) successive pairs of successive peak clockwise amplitudes of said rotational oscillations take on amplitude values differing by $\pi$ radians, and
(ii) successive pairs of successive peak counterclockwise amplitudes take on selected amplitude values differing by $\pi$ radians.

* * * * *